United States Patent
Guo et al.

(10) Patent No.: US 12,034,486 B2
(45) Date of Patent: Jul. 9, 2024

(54) FILTER, OPTICAL AMPLIFIER, COMMUNICATION SYSTEM, FILTERING METHOD, AND OPTICAL AMPLIFICATION METHOD

(71) Applicant: Huawei Technologies Co., Ltd., Shenzhen (CN)

(72) Inventors: Qiang Guo, Shenzhen (CN); Kui Ouyang, Wuhan (CN); Minghui Liu, Dongguan (CN); Shiyi Cao, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 71 days.

(21) Appl. No.: 17/990,331

(22) Filed: Nov. 18, 2022

(65) Prior Publication Data

US 2023/0084074 A1 Mar. 16, 2023

Related U.S. Application Data

(63) Continuation of application No. PCT/CN2021/072545, filed on Jan. 18, 2021.

(30) Foreign Application Priority Data

May 19, 2020 (CN) .......................... 202010423345.3

(51) Int. Cl.
*H04B 10/564* (2013.01)
*H04B 10/291* (2013.01)
*H04B 10/294* (2013.01)

(52) U.S. Cl.
CPC ....... *H04B 10/564* (2013.01); *H04B 10/2916* (2013.01); *H04B 10/2941* (2013.01)

(58) Field of Classification Search
CPC .............. H04B 10/564; H04B 10/2916; H04B 10/2941; G02F 1/395; G02F 1/365; G02F 1/353
(Continued)

(56) References Cited

U.S. PATENT DOCUMENTS

| 6,088,152 A | 7/2000 | Berger et al. |
| 6,275,313 B1 | 8/2001 | Denkin et al. |

(Continued)

FOREIGN PATENT DOCUMENTS

| CN | 1463107 A | * 12/2003 |
| CN | 1463107 A | 12/2003 |

(Continued)

*Primary Examiner* — Abbas H Alagheband
(74) *Attorney, Agent, or Firm* — Conley Rose, P.C.

(57) ABSTRACT

A filter includes a first filter component coupled to a second filter component. The first filter component is configured to receive an optical signal, and filter the optical signal based on a first power difference of signals transmitted on a plurality of frequency bands in the optical signal, where the first power difference includes a difference caused by a first doped optical fiber. The second filter component is loaded with a first driving electrical signal used to control a frequency response of the second filter component. The second filter component is configured to filter, using the frequency response based on a second power difference of the signals transmitted on the plurality of frequency bands, an optical signal obtained after the filtering by the first filter component.

20 Claims, 12 Drawing Sheets

(58) Field of Classification Search
USPC .......................................................... 398/197
See application file for complete search history.

(56) References Cited

U.S. PATENT DOCUMENTS

| | | |
|---|---|---|
| 6,456,427 B1 | 9/2002 | Chen et al. |
| 6,810,214 B2 | 10/2004 | Chbat et al. |
| 6,975,449 B1 * | 12/2005 | Mok .................. H04B 10/2942 |
| | | 359/341.41 |
| 7,460,297 B2 | 12/2008 | Eiselt |
| 7,995,269 B2 | 8/2011 | Zhou et al. |
| 2004/0120639 A1 * | 6/2004 | Elbers .............. H04B 10/07955 |
| | | 385/27 |
| 2006/0171019 A1 | 8/2006 | Charlet et al. |
| 2007/0058241 A1 * | 3/2007 | Chang ................ H01S 3/13013 |
| | | 359/337.12 |
| 2007/0115538 A1 | 5/2007 | Charlet et al. |
| 2008/0192333 A1 | 8/2008 | Bolshtyansky et al. |
| 2011/0020010 A1 | 1/2011 | Bruno et al. |

FOREIGN PATENT DOCUMENTS

| | | | | |
|---|---|---|---|---|
| CN | 1474208 A | * | 2/2004 | |
| CN | 1474208 A | | 2/2004 | |
| CN | 1578205 A | * | 2/2005 | |
| CN | 1578205 A | | 2/2005 | |
| CN | 1815927 A | | 8/2006 | |
| CN | 1972162 A | | 5/2007 | |
| CN | 101911549 A | | 12/2010 | |
| EP | 1035670 A2 | | 9/2000 | |
| EP | 1909414 A1 | | 4/2008 | |
| EP | 2947728 A1 | * | 11/2015 | ............. G02F 1/395 |
| JP | 2004101771 A | * | 4/2004 | ......... G02B 6/29355 |
| WO | WO-2019109783 A1 | * | 6/2019 | ................ H02J 7/35 |

* cited by examiner

FILTER, OPTICAL AMPLIFIER, COMMUNICATION SYSTEM, FILTERING METHOD, AND OPTICAL AMPLIFICATION METHOD

CROSS-REFERENCE TO RELATED APPLICATIONS

This application is a continuation of International Patent Application No. PCT/CN2021/072545, filed on Jan. 18, 2021, which claims priority to Chinese Patent Application No. 202010423345.3, filed on May 19, 2020. The disclosures of the aforementioned applications are hereby incorporated by reference in their entireties.

TECHNICAL FIELD

The present disclosure relates to the field of optical transmission technologies, and in particular, to a filter, an optical amplifier, a communication system, a filtering method, and an optical amplification method.

BACKGROUND

Currently, major communication operators all use optical fibers to transmit communication signals. Ensuring signal quality of the communication signals in an optical fiber transmission process is an important means for the communication operators to ensure quality of service.

However, in a process of transmitting communication signals by an optical fiber, the communication signals may be interfered with by a plurality of factors, resulting in deterioration in communication quality of the optical fiber transmission. For example, for communication signals on a plurality of frequency bands that are simultaneously transmitted by using a same optical fiber, the communication signals on the plurality of frequency bands have different powers due to impact of a stimulated Raman scattering (SRS) effect of the optical fiber and impact of a doped optical fiber used to amplify signals. As a result, an optical signal-to-noise ratio (OSNR) of a short-wavelength signal in the communication signals is decreased, and a nonlinear effect of a long-wavelength signal in the communication signals becomes stronger.

Therefore, a filter for filtering communication signals is proposed, which has great significance in ensuring signal quality in an optical fiber transmission process.

SUMMARY

The present disclosure provides a filter, an optical amplifier, a communication system, a filtering method, and an optical amplification method, to resolve a current problem.

According to a first aspect, the present disclosure provides a filter. The filter includes a first filter component and a second filter component that are coupled. The first filter component is configured to receive an optical signal, and filter the optical signal based on a first power difference of signals transmitted on a plurality of frequency bands in the optical signal. The first power difference includes a difference caused by a first doped optical fiber. The second filter component is loaded with a first driving electrical signal. The first driving electrical signal is used to control a frequency response of the second filter component. The second filter component is configured to filter, by using the frequency response based on a second power difference of the signals transmitted on the plurality of frequency bands, an optical signal obtained after the filtering by the first filter component. The second power difference includes a difference caused by a SRS effect.

In the filter provided in the present disclosure, the optical signal is filtered by the first filter component based on the first power difference of the signals transmitted on the plurality of frequency bands in the optical signal, and the optical signal obtained after the filtering by the first filter component is filtered by the second filter component by using the frequency response (controlled by the first driving electrical signal) based on the second power difference of the signals transmitted on the plurality of frequency bands. This can at least reduce or even eliminate interference caused to the optical signal by the first doped optical fiber and the SRS effect, thereby ensuring signal quality of the transmitted optical signal. Further, because the second filter component filters the optical signal by using the frequency response controlled by the first driving electrical signal, costs of the second filter component are reduced, and costs of the filter can be controlled while a filtering effect on the optical signal is ensured.

Optionally, the second filter component is further configured to adjust, under control by a second driving electrical signal, a range of wavelengths allowed by the second filter component.

A phase of the frequency response of the second filter component is controlled by using the second driving electrical signal, to adjust the range of wavelengths allowed to pass through the second filter component, so that the second filter component can filter optical signals on a plurality of wave bands, thereby improving compatibility of the second filter component.

In addition, in a feasible implementation, the filter may further include a control component separately coupled to the first filter component and the second filter component. The control component is configured to: obtain the second power difference based on the optical signal obtained after the filtering by the first filter component, and provide the first driving electrical signal to the second filter component based on the second power difference.

The control component can detect the second power difference in real time, to adjust the first driving electrical signal in real time based on the detected second power difference. The second power difference is detected in real time to adjust the first driving electrical signal in real time. In this way, the frequency response of the second filter component that is controlled by the first driving electrical signal can better match the second power difference, thereby effectively ensuring a filtering effect of the second filter component. For example, if wavelength adding or wavelength dropping occurs in an optical fiber transmission branch in which the filter is located, or when a configuration of a communication system in which the filter is located is switched between different wave bands, a SRS effect in a communication optical fiber may vary. In this case, the control component can accurately determine the second power difference of the optical signal, and provide the first driving electrical signal to the second filter component based on the second power difference, thereby ensuring a filtering effect of the filter.

The control component may include a sampling structure, a detection structure, and a processing structure that are sequentially coupled. The sampling structure is configured to sample, from the optical signal obtained after the filtering by the first filter component, signals transmitted on two or more frequency bands. The detection structure is configured to obtain a power of the signal that is transmitted on each frequency band and that is sampled by the sampling structure. The processing structure is configured to: obtain the second power difference based on the powers of the sampled signals transmitted on the two or more frequency bands, determine the first driving electrical signal based on the second power difference, and provide the first driving electrical signal to the second filter component.

Further, the control component may include one processing structure, a plurality of sampling structures, and a plurality of detection structures corresponding to the plurality of sampling structures. The sampling structures are coupled to the corresponding detection structures, and the plurality of detection structures are all coupled to the processing structure. Each sampling structure is configured to sample, from the optical signal obtained after the filtering by the first filter component, a signal transmitted on one frequency band. Each detection structure is configured to obtain a power of a signal that is transmitted on a frequency band and that is sampled by a corresponding sampling structure.

In this way, a power that is of a signal and that is obtained by each detection structure is not affected by another signal, accuracy of the obtained second power difference can be improved, and the filtering effect of the second filter component can be further improved.

In another feasible implementation, the filter further includes a control component coupled to the second filter component. The control component is configured to: obtain the second power difference based on a total input power of an optical fiber transmission branch in which the filter is located and a frequency bandwidth of an optical signal transmitted in the optical fiber transmission branch, determine the first driving electrical signal based on the second power difference, and provide the first driving electrical signal to the second filter component.

Optionally, a frequency response of the first filter component is determined based on a power difference caused by the doped optical fiber to signals transmitted on a target quantity of frequency bands. The target quantity is less than a total quantity of frequency bands allowed to pass through the doped optical fiber. For example, the target quantity is a half of the total quantity.

Generally, because a total quantity of frequency bands of an optical signal actually transmitted in a doped optical fiber may change, when a difference between the total quantity of frequency bands of the optical signal actually transmitted in the doped optical fiber and a specified quantity used to determine the frequency response of the first filter component is smaller, the frequency response of the first filter component better matches a power difference caused by the doped optical fiber to the actually transmitted optical signal, and an effect of filtering the optical signal by the first filter component is better. Therefore, when the frequency response of the first filter component is determined based on a half of the total quantity of frequency bands allowed to pass through the doped optical fiber, compared with determining the frequency response of the first filter component based on the total quantity of frequency bands allowed to pass through the doped optical fiber, in the present disclosure, there is a high probability that a difference between the total quantity of frequency bands of the optical signal actually transmitted in the doped optical fiber and the half of the total quantity of frequency bands allowed to pass through the doped optical fiber is less than a difference between the total quantity of frequency bands of the optical signal actually transmitted in the doped optical fiber and the total quantity of frequency bands allowed to pass through the doped optical fiber. As a result, there is a high probability that the frequency response of the first filter component that is determined based on the half of the total quantity of frequency bands allowed to pass through the doped optical fiber better matches a power difference caused by the first doped optical fiber, and accordingly a probability that the frequency response of the first filter component matches the first power difference can be increased, thereby ensuring effectiveness of the filtering by the first filter component.

In a feasible implementation, the first filter component includes a gain flattening filter (GFF); and/or the second filter component includes a variable gain tilt filter (VGTF).

Optionally, a material of the second filter component may be one or a combination of a plurality of the following: ceramic, a lithium niobate electro-optic material, and a LiTiO3 electro-optic material.

According to a second aspect, the present disclosure provides an optical amplifier. The optical amplifier includes a first doped optical fiber and the filter provided in the first aspect. The first doped optical fiber and the filter are coupled. The first doped optical fiber is configured to amplify an optical signal by using doped ions in the first doped optical fiber.

In the optical amplifier provided in the present disclosure, the optical signal is amplified by the first doped optical fiber, an optical signal obtained after the amplification is filtered by the first filter component based on a first power difference of signals transmitted on a plurality of frequency bands in the optical signal obtained after the amplification, and an optical signal obtained after the filtering by the first filter component is filtered by the second filter component by using a frequency response (controlled by a first driving electrical signal) based on a second power difference of the signals transmitted on the plurality of frequency bands. This can amplify the optical signal, and at least reduce or even eliminate interference caused to the optical signal by the doped optical fiber and a SRS effect, thereby ensuring signal quality of the transmitted optical signal. Further, because the second filter component filters the optical signal by using the frequency response controlled by the first driving electrical signal, costs of the second filter component are reduced, and costs of the filter can be controlled while a filtering effect on the optical signal is ensured.

Optionally, to ensure an amplification effect of the optical amplifier, the optical amplifier may further include a second doped optical fiber coupled to the filter. The second doped optical fiber is configured to perform saturated amplification on the optical signal obtained after the filtering by the filter and output an obtained optical signal.

According to a third aspect, the present disclosure provides a communication system. The communication system includes the optical amplifier provided in the second aspect.

In a first deployment manner of the communication system, after a power difference occurs in an optical signal, the filter provided in the present disclosure may be used to perform filtering based on the power difference, to resist a SRS effect in a communication optical fiber. In this case, the communication system further includes a plurality of segments of communication optical fibers. The communication optical fibers are configured to transmit an optical signal, and an output end of each segment of communication optical fiber is coupled to one or more optical amplifiers.

In a second deployment manner of the communication system, the filter provided in the present disclosure may be first used to pre-filter an optical signal, and a power difference of an optical signal obtained after the pre-filtering is used to resist a SRS effect in a communication optical fiber, thereby achieving an objective of filtering the optical signal based on the power difference. In this case, the communication system may further include a plurality of segments of communication optical fibers. The communication optical fibers are configured to transmit an optical signal, and an input end of each segment of communication optical fiber is coupled to one or more optical amplifiers.

According to a fourth aspect, the present disclosure provides a filtering method. The filtering method is applied to the filter provided in the first aspect. The filter includes a first filter component and a second filter component that are coupled. The filtering method includes: receiving an optical signal; filtering, by the first filter component, the optical signal based on a first power difference of signals transmitted on a plurality of frequency bands in the optical signal, where the first power difference includes a difference caused by a first doped optical fiber; and filtering, by the second filter component by using a frequency response (controlled by a first driving electrical signal) based on a second power difference of the signals transmitted on the plurality of frequency bands, an optical signal obtained after the filtering by the first filter component, where the second power difference includes a difference caused by a SRS effect.

Optionally, the filtering method further includes: adjusting a second driving electrical signal to be provided to the second filter component, so as to adjust a range of wavelengths allowed to pass through the second filter component.

Optionally, the filter further includes: a control component separately coupled to the first filter component and the second filter component. Before the filtering, by the second filter component by using a frequency response (controlled by a first driving electrical signal) based on a second power difference of the signals transmitted on the plurality of frequency bands, an optical signal obtained after the filtering by the first filter component, the filtering method further includes: obtaining, by the control component, the second power difference based on the optical signal obtained after the filtering by the first filter component; and providing, by the control component, the first driving electrical signal to the second filter component based on the second power difference.

Optionally, the obtaining the second power difference based on the optical signal obtained after the filtering by the first filter component includes: sampling, from the optical signal obtained after the filtering by the first filter component, signals transmitted on two or more frequency bands; obtaining a power of the sampled signal transmitted on each frequency band; and obtaining the second power difference based on the powers of the sampled signals transmitted on the two or more frequency bands.

Optionally, the providing the first driving electrical signal to the second filter component based on the second power difference includes: determining the first driving electrical signal based on the second power difference, and providing the first driving electrical signal to the second filter component.

Optionally, before the filtering, by the second filter component by using a frequency response (controlled by a first driving electrical signal) based on a second power difference of the signals transmitted on the plurality of frequency bands, an optical signal obtained after the filtering by the first filter component, the filtering method further includes: obtaining the second power difference based on a total input power of an optical fiber transmission branch in which the filter is located and a frequency band width of the optical signal transmitted in the optical fiber transmission branch, determining the first driving electrical signal based on the second power difference; and providing the first driving electrical signal to the second filter component.

According to a fifth aspect, the present disclosure provides an optical amplification method. The optical amplification method is applied to the optical amplifier provided in the second aspect. The optical amplifier includes a first doped optical fiber and the filter provided in the first aspect. The first doped optical fiber and the filter are coupled. The optical amplification method includes: amplifying, by the first doped optical fiber, an optical signal; and filtering, by the filter by using the filtering method provided in the fourth aspect, an optical signal obtained after the amplification by the first doped optical fiber.

According to a sixth aspect, the present disclosure provides a storage medium. When instructions in the storage medium are executed by a processor, the filtering method provided in the fourth aspect is implemented.

According to a seventh aspect, a first computer program product including instructions is provided. When the first computer program product is run on a computer, the computer is enabled to perform the filtering method provided in the fourth aspect.

DESCRIPTION OF EMBODIMENTS

Figure 1:
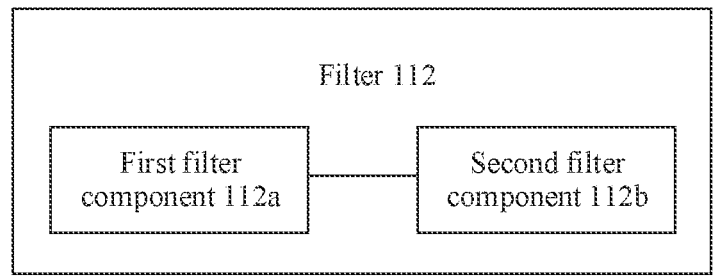
FIG. 1 is a schematic diagram of a structure of a filter according to an embodiment of the present disclosure.

To make objectives, technical solutions, and advantages of the present disclosure clearer, the following further describes implementations of the present disclosure in detail with reference to the accompanying drawings.

For ease of understanding, the following first describes terms in embodiments of the present disclosure.

The C band, L band, and super C band are different transmission frequency bands. For example, the C band is a frequency band with wavelengths ranging from 1530 nm to 1565 nm, and the L band is a frequency band with wavelengths ranging from 1565 nm to 1625 nm.

SRS effect: After intense interaction occurs between high-intensity laser light and substance molecules, a scattering process has a stimulated emission property, and such scattered light emitted by stimulation is Raman scattered light. Therefore, this nonlinear optical effect is called SRS effect. The SRS effect affects a power of a transmitted optical signal. Moreover, the SRS effect has different degrees of impact on powers of optical signals transmitted on different frequency bands. For example, for optical signals on a plurality of frequency bands transmitted in a same communication optical fiber, initial powers of the optical signals on the plurality of frequency bands are the same, that is, a slope of an initial power spectrum of the optical signals on the plurality of frequency bands is 0. As the SRS effect has different degrees of impact on the powers of the optical signals on the plurality of frequency bands, the slope of the power spectrum of the optical signals on the plurality of frequency bands changes from 0 to a positive number, that is, the power spectrum is tilted.

OSNR: a ratio of a power of an optical signal to a noise power within 0.1 nanometers (nm). The OSNR is used to measure quality of an optical signal. A higher OSNR indicates better quality of an optical signal.

Electro-optic material: an optical functional material having an electro-optic effect. The electro-optic effect of an electro-optic material can be used to modulate an optical signal. The electro-optic effect refers to a phenomenon that a refractive index of a material changes under the action of an externally applied electric field.

In an optical fiber transmission process, ensuring signal quality of an optical signal has great significance. Generally, when an optical signal is transmitted by using a communication optical fiber, signal attenuation occurs in a transmission process of the optical signal. For this, a communication operator further disposes optical amplifiers in a communication transmission link to amplify an optical signal, so that the optical signal to be transmitted to a destination can meet a use requirement. In addition, communication optical fibers and optical amplifiers are deployed in an optical fiber transmission link as follows: After an optical signal is transmitted from a transmitter, the optical signal is first transmitted by one segment of communication optical fiber with a specific length, and then the optical signal transmitted through the communication optical fiber is amplified by an optical amplifier. Afterwards, an optical signal obtained after the amplification is transmitted by one segment of communication optical fiber with a specific length, and then the optical signal transmitted through the communication optical fiber is amplified by an optical amplifier. This process is repeated until the optical signal is transmitted to a destination (for example, a receiver).

However, in a process of transmitting an optical signal by an optical fiber, the optical signal may be interfered with by a plurality of factors, resulting in deterioration in signal quality of the optical fiber in the optical fiber transmission. For example, for optical signals on M frequency bands that are simultaneously transmitted by using a same optical fiber, initial powers of the optical signals on the M frequency bands are respectively P1, P2, . . . , and PM, and P1=P2= . . . =PM. Under impact of a SRS effect of the optical fiber and impact of a doped optical fiber configured to amplify a signal in an optical amplifier, a power of a short-wavelength signal in the optical signals are transferred to a long-wavelength signal. As a result, the powers of the optical signals on the M frequency bands sequentially become P1', P2', . . . , and PM', and P1'<P2'< . . . <PM'. In other words, the optical signals on the M frequency bands have different powers. Consequently, an OSNR of the short-wavelength signal in the optical signals decreases, and a nonlinear effect of the long-wavelength signal in the optical signals becomes stronger. Signals on a plurality of frequency bands simultaneously transmitted by using a same optical fiber are used to carry different information.

For this, an embodiment of the present disclosure provides a filter 112. As shown in FIG. 1, the filter 112 includes a first filter component 112a and a second filter component 112b that are coupled.

The first filter component 112a is configured to receive an optical signal, and filter the optical signal based on a first power difference of signals transmitted on a plurality of frequency bands in the optical signal. The first power difference includes a difference caused by a first doped optical fiber 111. A power difference refers to a difference between powers of signals transmitted on a plurality of frequency bands.

The second filter component 112b is loaded with a first driving electrical signal. The first driving electrical signal is used to control a frequency response of the second filter component 112b. The second filter component 112b is configured to filter, by using the frequency response (controlled by the first driving electrical signal) based on a second power difference of the signals transmitted on the plurality of frequency bands, an optical signal obtained after the filtering by the first filter component 112a. The second power difference includes a difference caused by a SRS effect.

It can be learned from the foregoing description that, in the filter 112 provided in this embodiment of the present disclosure, the optical signal is filtered by the first filter component 112a based on the first power difference of the signals transmitted on the plurality of frequency bands in the optical signal, and the optical signal obtained after the filtering by the first filter component 112a is filtered by the second filter component 112b by using the frequency response (controlled by the first driving electrical signal) based on the second power difference of the signals transmitted on the plurality of frequency bands. This can at least reduce or even eliminate interference caused to the optical signal by the doped optical fiber and the SRS effect, for example, a power difference of the signals transmitted on the plurality of frequency bands in the optical signal output by the filter 112 may be less than ±3 decibels (dB), thereby ensuring signal quality of the transmitted optical signal.

Figure 2:
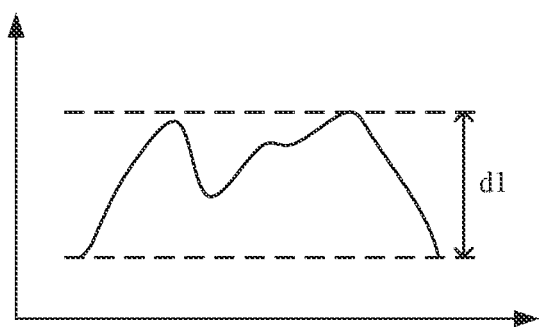
FIG. 2 is a schematic diagram of a power spectrum of an optical signal according to an embodiment of the present disclosure.
Figure 3:
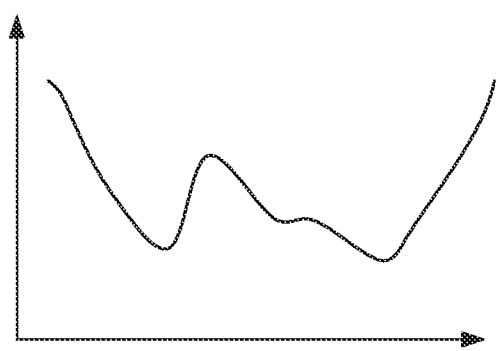
FIG. 3 is a schematic diagram of a frequency response of a first filter component according to an embodiment of the present disclosure.
Figure 4:
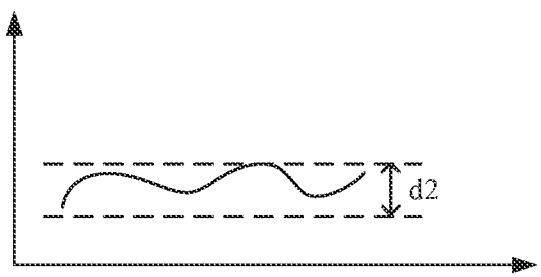
FIG. 4 is a schematic diagram of a power spectrum of an optical signal obtained after filtering by a first filter component according to an embodiment of the present disclosure.

The first filter component 112a may have a fixed frequency response. The frequency response may be determined based on the first power difference occurring in the optical signal. Therefore, when the optical signal passes through the first filter component 112a, an effect of filtering the optical signal can be achieved under the action of the frequency response of the first filter component 112a. For example, FIG. 2 is a schematic diagram of a power spectrum of the optical signal. It can be seen from FIG. 2 that, a gain flatness of the optical signal is d1. FIG. 3 is a schematic diagram of the frequency response of the first filter component 112a. FIG. 4 is a schematic diagram of a power spectrum of the optical signal obtained after the filtering by the first filter component 112a. It can be seen from FIG. 4 that, a gain flatness of the optical signal obtained after the filtering by the first filter component 112a is d2, and d2<d1. That is, the first filter component 112a compensates for the power difference of the optical signal. Therefore, it can be determined that, an effect of filtering the optical signal is achieved under the action of the frequency response of the first filter component 112a on the optical signal.

Optionally, the first power difference of the optical signal may be estimated in advance, and then the frequency response of the first filter component 112a may be determined based on the first power difference, to ensure a filtering effect of filtering the optical signal by the first filter component 112a based on the first power difference. For example, when the first power difference is a difference caused by a doped optical fiber, if a doped optical fiber with specific doping density is used to amplify an optical signal transmitted on a specific frequency band, because the doping density of the doped optical fiber is determined and the frequency band of the amplified optical signal is determined, the first power difference occurring in the optical signal under the action of the doped optical fiber may be estimated based on the doping density and the frequency band. It should be noted that, when the first power difference further includes a difference caused by another factor, the first power difference may be further estimated based on the another factor. This is not specifically limited in this embodiment of the present disclosure.

In addition, the frequency response of the first filter component 112a may be determined based on a power difference caused by a doped optical fiber to signals transmitted on a target quantity of frequency bands in the optical signal. The target quantity is less than a total quantity of frequency bands allowed to pass through the doped optical fiber. In a feasible implementation, the target quantity may be a half of the total quantity of frequency bands allowed to pass through the doped optical fiber. For example, when a C-band optical signal is transmitted by using an optical fiber, and a total quantity of frequency bands allowed to pass through a doped optical fiber is 80, the frequency response of the first filter component 112a may be determined based on a power difference caused by the doped optical fiber to signals transmitted on 40 frequency bands.

Generally, the frequency response of the first filter component 112a needs to be preset before the first filter component 112a is put into use. In addition, the frequency response of the first filter component 112a is determined based on a power difference caused by a doped optical fiber to signals transmitted on a specified quantity of frequency bands in the optical signal allowed to pass through the doped optical fiber in the optical signal. In addition, because a total quantity of frequency bands of an optical signal actually transmitted in a doped optical fiber may change, when a difference between the total quantity of frequency bands of the optical signal actually transmitted in the doped optical fiber and a specified quantity used to determine the frequency response of the first filter component 112a is smaller, the frequency response of the first filter component 112a better matches a power difference caused by the doped optical fiber to the actually transmitted optical signal, and an effect of filtering the optical signal by the first filter component 112a is better. Therefore, when the frequency response of the first filter component 112a is determined based on a half of the total quantity of frequency bands allowed to pass through the doped optical fiber, compared with determining the frequency response of the first filter component 112a based on the total quantity of frequency bands allowed to pass through the doped optical fiber, in the present disclosure, there is a high probability that a difference between the total quantity of frequency bands of the optical signal actually transmitted in the doped optical fiber and the half of the total quantity of frequency bands allowed to pass through the doped optical fiber is less than a difference between the total quantity of frequency bands of the optical signal actually transmitted in the doped optical fiber and the total quantity of frequency bands allowed to pass through the doped optical fiber. As a result, there is a high probability that the frequency response of the first filter component 112a that is determined based on the half of the total quantity of frequency bands allowed to pass through the doped optical fiber better matches the power difference caused by the first doped optical fiber, and accordingly a probability that the frequency response of the first filter component 112a matches the first power difference can be increased, thereby ensuring effectiveness of the filtering by the first filter component 112a. That the frequency response of the first filter component 112a matches the first power difference means that the first power difference can be entirely eliminated after the optical signal is filtered by the first filter 112.

Figure 5:
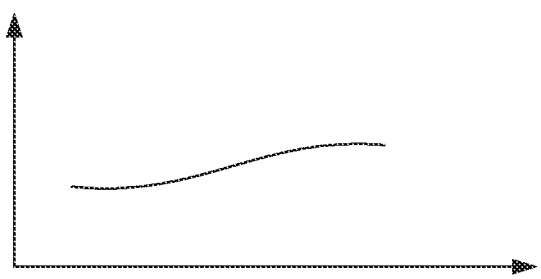
FIG. 5 is a schematic diagram of a frequency response of a second filter component according to an embodiment of the present disclosure.
Figure 6:
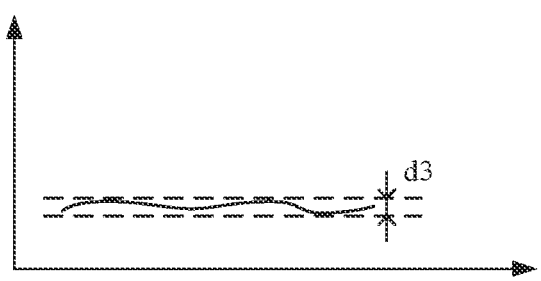
FIG. 6 is a schematic diagram of a power spectrum of an optical signal obtained after filtering by a second filter component according to an embodiment of the present disclosure.

The frequency response of the second filter component 112b may be controlled by the first driving electrical signal. When the optical signal passes through the first filter component 112a, the effect of filtering the optical signal can be achieved under the action of the frequency response of the first filter component 112a. For example, FIG. 4 is the schematic diagram of the power spectrum of the optical signal obtained after the filtering by the first filter component 112a. It can be seen from FIG. 4 that, the power spectrum of the optical signal is further tilted to a specific extent, and the gain flatness of the optical signal is d2. The gain flatness may be caused by the SRS effect, and therefore the optical signal may be filtered by using the second filter component 112b. FIG. 5 is a schematic diagram of the frequency response of the second filter component 112b. FIG. 6 is a schematic diagram of a power spectrum of an optical signal obtained after the filtering by the second filter component 112b. It can be seen from FIG. 6 that, a gain flatness of the optical signal obtained after the filtering by the second filter component 112b is d3, and d3<d2. That is, the second filter component 112b compensates for the power difference of the optical signal. Therefore, it can be determined that, an effect of filtering the optical signal is achieved under the action of the frequency response of the second filter component 112b on the optical signal.

Optionally, the second power difference of the optical signal may also be obtained in advance, then the first driving electrical signal is determined based on the second power difference, and the first driving electrical signal is subsequently provided to the second filter component 112b, so that the second filter component 112b filters the optical signal based on the second power difference by using the frequency response controlled by the first driving electrical signal, to ensure a filtering effect of filtering the optical signal based on the second power difference by using the second filter component 112b.

For example, when the second power difference is a difference caused by the SRS effect, the second power difference may be obtained based on a factor that affects intensity of the SRS effect.

In a first feasible implementation of obtaining the second power difference, the second power difference may be estimated in real time during use of the filter 112, to dynamically adjust the first driving electrical signal based on the second power difference. In this case, the second power difference may be estimated based on an actual total input power of an optical fiber transmission branch in which the filter 112 is located, a frequency band width of the optical signal actually transmitted in the optical fiber transmission branch, and a total length of a communication optical fiber 12 that causes the SRS effect. In addition, the second power difference is obtained based on a real-time status of the optical signal transmitted by the optical fiber to dynamically adjust the first driving electrical signal. In this way, the frequency response of the second filter component 112b that is controlled by the first driving electrical signal can better match the second power difference, thereby effectively ensuring a filtering effect of the second filter component 112b.

In a second feasible implementation of obtaining the second power difference, the second power difference may be detected in real time, to adjust the first driving electrical signal in real time based on the detected second power difference. The second power difference is detected in real time to adjust the first driving electrical signal in real time. In this way, the frequency response of the second filter component 112b that is controlled by the first driving electrical signal can better match the second power difference, thereby effectively ensuring a filtering effect of the second filter component 112b.

Figure 7:
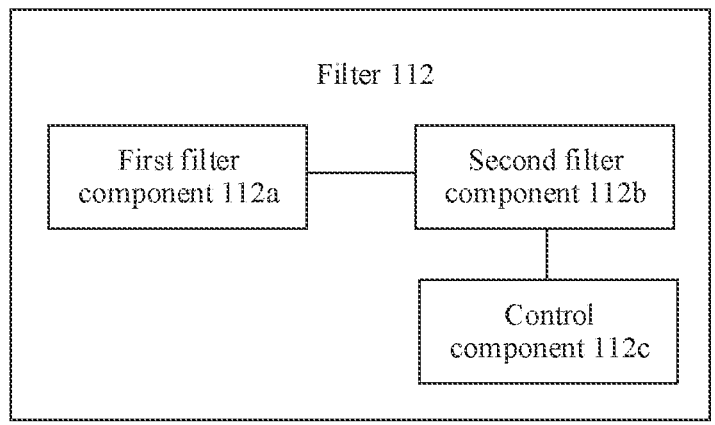
FIG. 7 is a schematic diagram of a structure of another filter according to an embodiment of the present disclosure.
Figure 8:
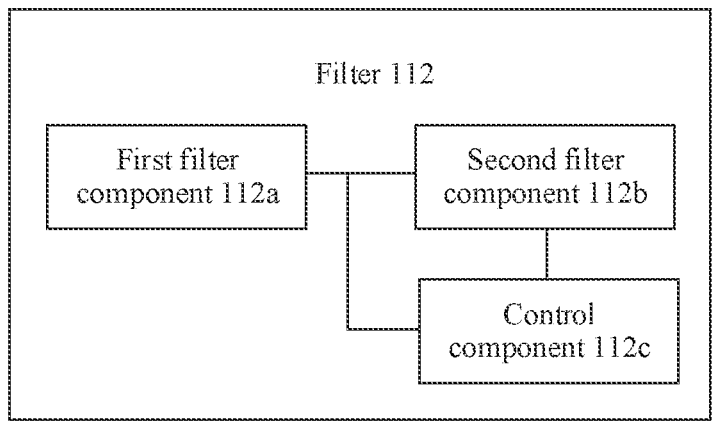
FIG. 8 is a schematic diagram of a structure of still another filter according to an embodiment of the present disclosure.

Optionally, as shown in FIG. 7 and FIG. 8, the filter 112 may further include a control component 112c. The foregoing operations of obtaining the second power difference, determining the first driving electrical signal based on the second power difference, and providing the first driving electrical signal to the second filter component 112b may be performed by the control component 112c.

In addition, corresponding to different implementations of obtaining the second power difference, the control component 112c also has different implementations.

For example, corresponding to the first and the second feasible implementations of obtaining the second power difference, as shown in FIG. 7, the control component 112c may be coupled to the second filter component 112b. After obtaining the second power difference, the control component 112c may determine the first driving electrical signal based on the second power difference, and provide the first driving electrical signal to the second filter component 112b.

For another example, corresponding to a third feasible implementation of obtaining the second power difference, as shown in FIG. 8, the control component 112c is separately coupled to the first filter component 112a and the second filter component 112b. The control component 112c may obtain the second power difference by performing real-time detection on the optical signal obtained after the filtering by the first filter component 112a, then determine the first driving electrical signal based on the second power difference, and provide the first driving electrical signal to the second filter component 112b.

Figure 9:
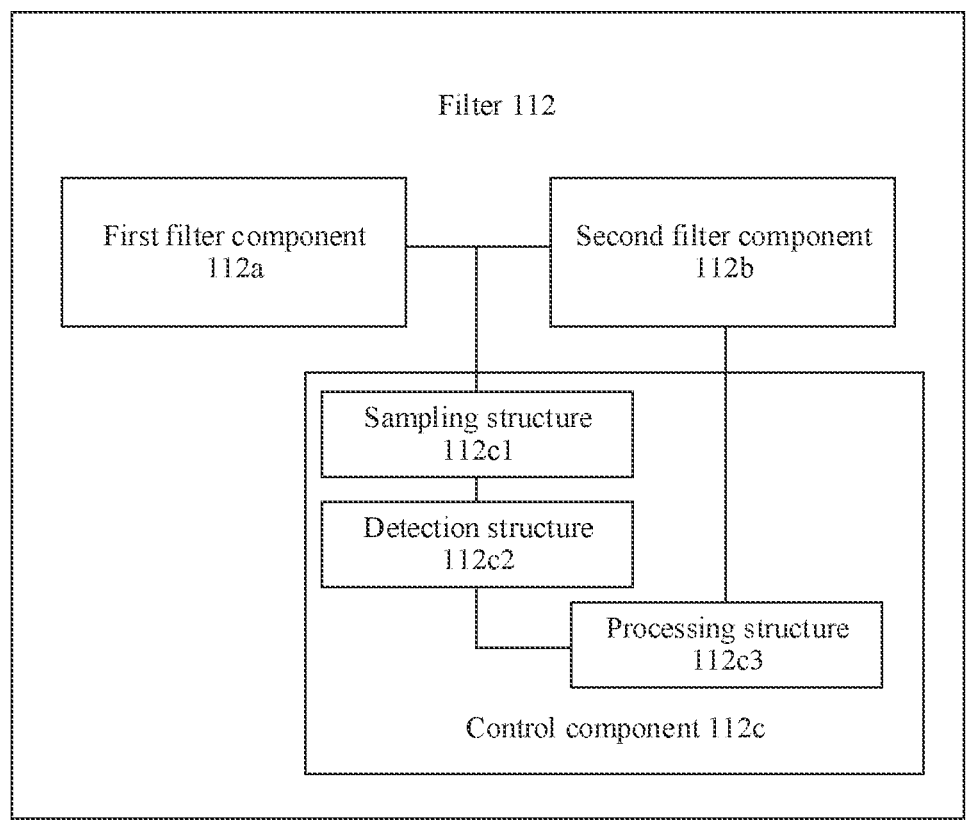
FIG. 9 is a schematic diagram of a structure of yet another filter according to an embodiment of the present disclosure.

In a feasible implementation, as shown in FIG. 9, the control component 112c includes: a sampling structure 112c1, a detection structure 112c2, and a processing structure 112c3 that are sequentially coupled, and functions of the structures are as follows:

The sampling structure 112c1 is configured to sample, from the optical signal obtained after the filtering by the first filter component 112a, signals transmitted on two or more frequency bands. Optionally, the sampling structure 112c1 may be a filter.

The detection structure 112c2 is configured to obtain a power of the signal that is transmitted on each frequency band and that is sampled by the sampling structure 112c1. Optionally, the detection structure 112c2 may be a photodetector 114.

The processing structure 112c3 is configured to: obtain the second power difference based on the powers of the sampled signals transmitted on the two or more frequency bands, determine the first driving electrical signal based on the second power difference, and provide the first driving electrical signal to the second filter component 112b. In a feasible implementation, the processing structure 112c3 may store a correspondence between a power difference and a driving signal, and after obtaining the second power difference, the processing structure 112c3 may query the correspondence based on the second power difference to obtain the first driving electrical signal corresponding to the second power difference.

Figure 10:
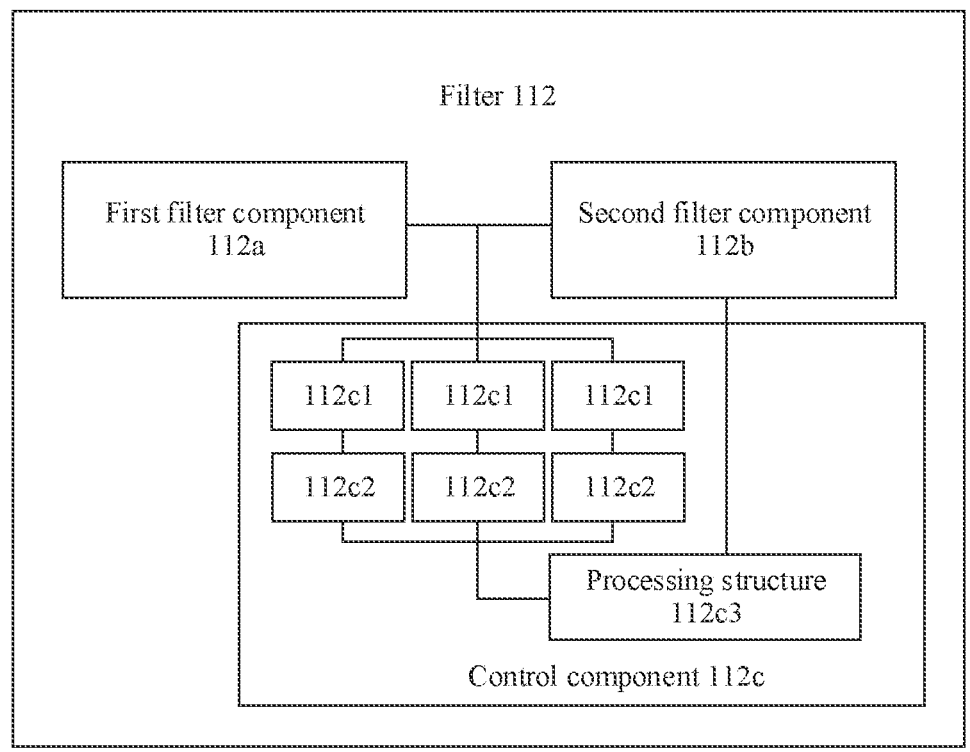
FIG. 10 is a schematic diagram of a structure of still yet another filter according to an embodiment of the present disclosure.

Further, as shown in FIG. 10, the control component 112c may include one processing structure 112c3, a plurality of sampling structures 112c1, and a plurality of detection structures 112c2 corresponding to the plurality of sampling structures 112c1. The sampling structures 112c1 are coupled to the corresponding detection structures 112c2, and the plurality of detection structures 112c2 are all coupled to the processing structure 112c3. In addition, each sampling structure 112c1 is configured to sample, from the optical signal obtained after the filtering by the first filter component 112a, a signal transmitted on one frequency band. Correspondingly, each detection structure 112c2 is configured to obtain a power of a signal that is transmitted on a frequency band and that is sampled by a corresponding sampling structure 112c1. In this way, a power that is of a signal and that is obtained by each detection structure 112c2 is not affected by another signal, accuracy of the obtained second power difference can be improved, and the filtering effect of the second filter component 112b can be further improved.

The following uses the filter 112 shown in FIG. 10 as an example to describe a filtering principle of the filter 112. After an optical signal enters the first filter component 112a, the first filter component 112a may filter the optical signal based on a first power difference. One part of a signal obtained after the filtering by the first filter component 112a enters the second filter component 112b, and the other part thereof enters the plurality of sampling structures 112c1. Each sampling structure 112c1 samples a signal transmitted on one frequency band from the optical signal obtained after the filtering, and couples the sampled signal to its corresponding detection structure 112c2. The detection structure 112c2 obtains a power of the signal coupled to the detection structure 112c2, and feeds back the power of the signal to the processing structure 112c3. The processing structure 112c3 determines a second power difference based on powers that are of signals transmitted on a plurality of frequency bands and that are fed back by the plurality of detection structures 112c2, and queries the correspondence between a power difference and a driving electrical signal based on the second power difference, to obtain a first driving electrical signal used to control the second filter component 112b, and provide the first driving electrical signal to the second filter component 112b. After the optical signal obtained after the filtering by the first filter component 112a enters the second filter component 112b, the second filter component 112b uses a frequency response controlled by the first driving electrical signal to filter the optical signal obtained after the filtering by the first filter component 112a.

The second filter component 112b may be made of an electro-optic material having an electro-optic coefficient. Correspondingly, an implementation in which the first driving electrical signal controls the frequency response of the second filter component 112b may be as follows: The first driving electrical signal adjusts the frequency response of the second filter component 112b by using the electro-optic coefficient of the second filter component 112b.

In addition, to ensure a speed of adjusting the frequency response of the second filter component 112b by the first driving electrical signal, the second filter component 112b may be made of an electro-optic material having a relatively high electro-optic coefficient. For example, the electro-optic material of the second filter component 112b may have a rated electro-optic coefficient greater than $1 \times 10^{-16}$ square meters per square volt ($m^2/V^2$). For example, the material of the second filter component 112b may be one or a combination of a plurality of the following: ceramic, a lithium niobate electro-optic material, and a LiTiO3 electro-optic material.

When the second filter component 112b is made of an electro-optic material having a relatively high electro-optic coefficient, rapid adjustment of the frequency response of the second filter component 112b can be implemented by using the first driving electrical signal. In this way, the second filter component 112b can quickly react to a change of the SRS effect to quickly filter the optical signal based on the second power difference, thereby ensuring instant performance of filtering the optical signal. Correspondingly, the filter 112 can be configured to filter optical signals on different wave bands or different frequency bands, for example, may be configured to filter optical signals on the C band, optical signals on the L band, optical signals on the super C band, optical signals on a C+L band, optical signals on a L+super C band, and optical signals with higher frequencies. This ensures a use range of the filter 112.

Optionally, the first filter component 112a may include a GFF, and/or the second filter component 112b may include a VGTF.

In addition, it can be learned from the foregoing content that, filtering the optical signal by the second filter component 112b based on the second power difference is implemented by controlling an amplitude of the frequency response of the second filter component 112b by the first driving electrical signal. The second filter component 112b may be further loaded with a second driving electrical signal. The second driving electrical signal can adjust a range of wavelengths allowed to pass through the second filter component 112b by controlling a phase of the frequency response of the second filter component 112b, so that the second filter component 112b can filter optical signals on a plurality of wave bands, thereby improving compatibility of the second filter component 112b.

For example, when the second filter component 112b is a VGTF, a frequency response of the VGTF is a sine wave, and an amplitude of the frequency response of the VGTF may be controlled by the first driving electrical signal, to adjust a filtering effect of the VGTF on the optical signal. A phase of the frequency response of the VGTF may be controlled by the second driving signal, to adjust a range of wavelengths allowed to pass through the second filter component 112b, so that the second filter component 112b can filter optical signals on different wave bands.

In conclusion, in the filter provided in this embodiment of the present disclosure, the optical signal is filtered by the first filter component based on the first power difference of the signals transmitted on the plurality of frequency bands in the optical signal, and the optical signal obtained after the filtering by the first filter component is filtered by the second filter component by using the frequency response (controlled by the first driving electrical signal) based on the second power difference of the signals transmitted on the plurality of frequency bands. This can at least reduce or even eliminate interference caused to the optical signal by the doped optical fiber and the SRS effect, thereby ensuring signal quality of the transmitted optical signal. Further, because the second filter component filters the optical signal by using the frequency response controlled by the first driving electrical signal, costs of the second filter component are reduced, and costs of the filter can be controlled while a filtering effect on the optical signal is ensured.

Figure 11:
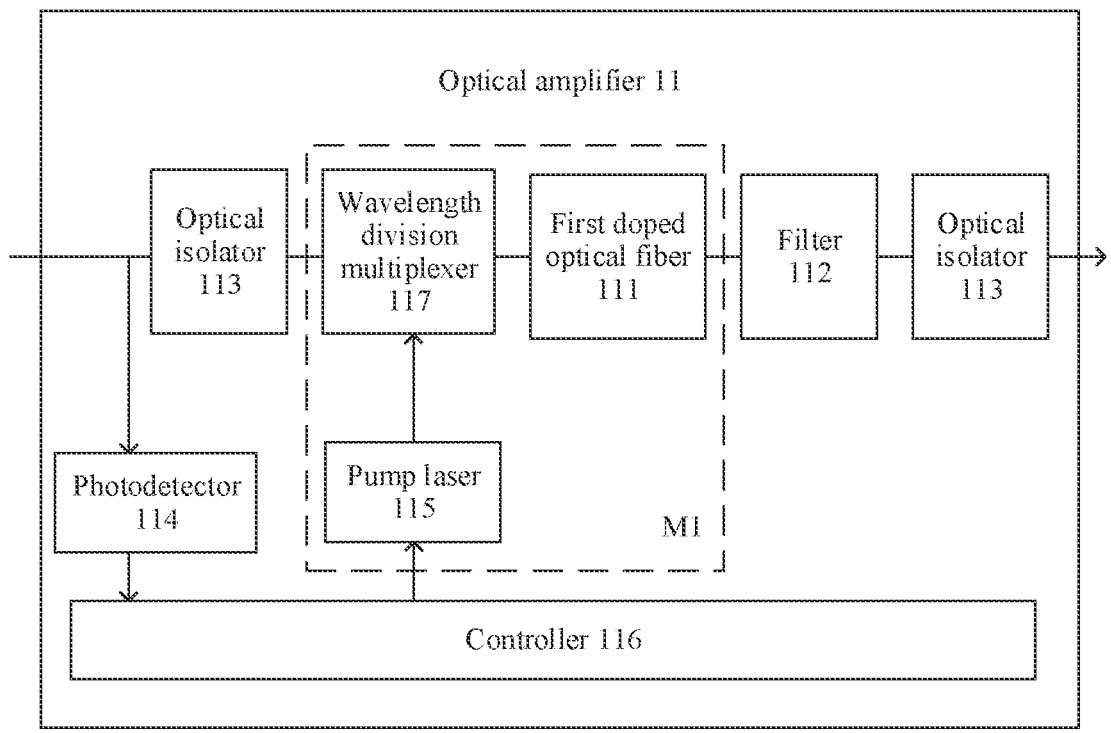
FIG. 11 is a schematic diagram of a structure of an optical amplifier according to an embodiment of the present disclosure.

An embodiment of the present disclosure further provides an optical amplifier 11. As shown in FIG. 11, the optical amplifier 11 may include an optical isolator 113, a photodetector 114, a pump laser 115, a controller 116, a wavelength-division multiplexer (WDM) 117, a first doped optical fiber 111, and the filter 112 provided in the embodiment of the present disclosure. The optical isolator 113 is coupled to the WDM 117, the photodetector 114 is coupled to the controller 116, the pump laser 115 is separately coupled to the controller 116 and the WDM 117, and the doped optical fiber is separately coupled to the WDM 117 and the filter 112.

A principle of amplifying an optical signal by the optical amplifier 11 is as follows: One part of the optical signal that is obtained after splitting by an optical splitter enters the optical isolator 113, and the other part thereof enters the photodetector 114. The optical isolator 113 is configured to isolate the optical signal, to prevent the optical signal that enters the optical amplifier 11 from being back scattered from the optical amplifier 11 to a communication optical fiber 12, thereby ensuring transmission quality of the optical signal. The photodetector 114 is configured to detect an input power of the optical signal input to the optical amplifier 11, and feed back the input power to the controller 116. The controller 116 is configured to control an output power of the pump laser 115 based on an input power of the optical signal, so that signals transmitted on a plurality of frequency bands in an optical signal obtained after the amplification by the first doped optical fiber 111 have a basically same amplification gain, making amplification on the optical signal by the first doped optical fiber 111 being in a gain locking mode. Pump light emitted by the pump laser 115 and the optical signal entering the optical isolator 113 are coupled by the WDM 117 and then enter the first doped optical fiber 111. Doped ions in the first doped optical fiber 111 transition from a low energy level to a high energy level under the action of the pump light, and transform into an excited state. The doped ions at the high energy level can return from the excited state to a ground state under the action of the optical signal incident to the first doped optical fiber 111. In addition, in a process of returning to the ground state, the doped ions emit photons having a same frequency as the optical signal, thereby amplifying the optical signal. After the optical signal obtained after the amplification by the first doped optical fiber 111 enters the filter 112, a first filter component 112a may filter the optical signal based on a first power difference of the optical signal. After an optical signal obtained after the filtering enters a second filter component 112b, the second filter component 112b may filter the optical signal based on a second power difference of the optical signal. In this way, powers of signals transmitted on a plurality of frequency bands in the optical signal obtained after the amplification are basically the same.

A structure formed by the pump laser 115, the WDM 117, and the doped optical fiber may be referred to as a first-stage amplification structure of the optical amplifier 11. Optionally, because the doped optical fiber has a limited amplification factor for the optical signal, the optical amplifier 11 may have more stages of amplification structures in addition to the first-stage amplification structure (shown by a dashed frame M1 in FIG. 11). Each stage of amplification structure includes a doped optical fiber for amplifying the optical signal. In addition, for an amplification structure not used for saturated amplification on the optical signal in the plurality of stages of amplification structures, an output end of the amplification structure may be coupled to the filter 112, so that a signal obtained after amplification by the amplification structure is filtered by the filter 112, and an optical signal obtained after the filtering by the filter 112 is coupled to a next-stage amplification structure.

Figure 12:
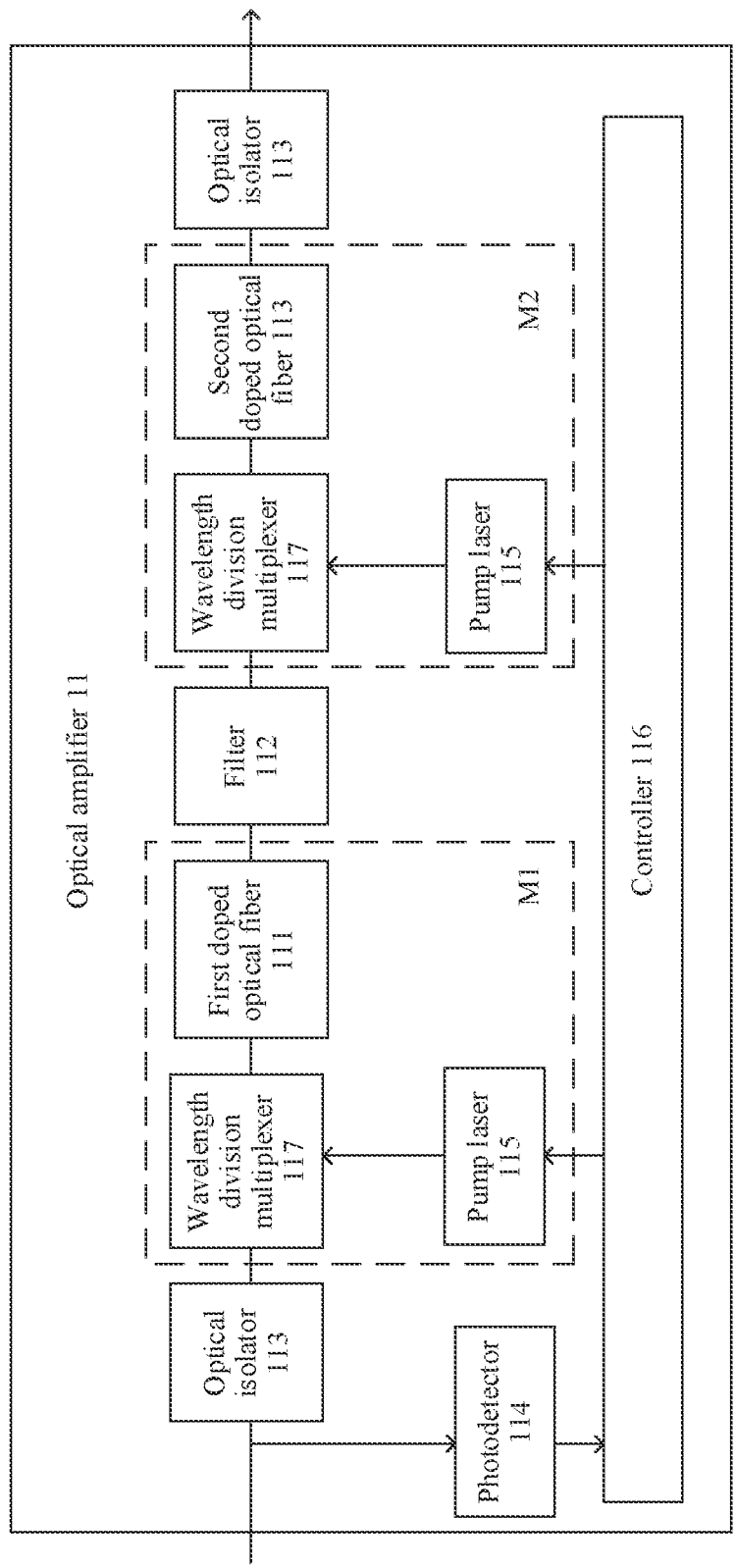
FIG. 12 is a schematic diagram of a structure of another optical amplifier according to an embodiment of the present disclosure.

For example, as shown in FIG. 12, the optical amplifier 11 may further include a second-stage amplification structure (shown by a dashed frame M2 in FIG. 12) coupled to the filter 112. The second-stage amplification structure includes a second doped optical fiber 113, and the second doped optical fiber 113 is configured to perform saturated amplification on the optical signal obtained after the filtering by the filter 112 and output an obtained optical signal. In addition, because the second-stage amplification structure performs saturated amplification on the optical signal, no power difference occurs in an optical signal obtained after the amplification by the second-stage amplification structure. Therefore, no filter 112 needs to be disposed after the second-stage amplification structure.

Figure 13:
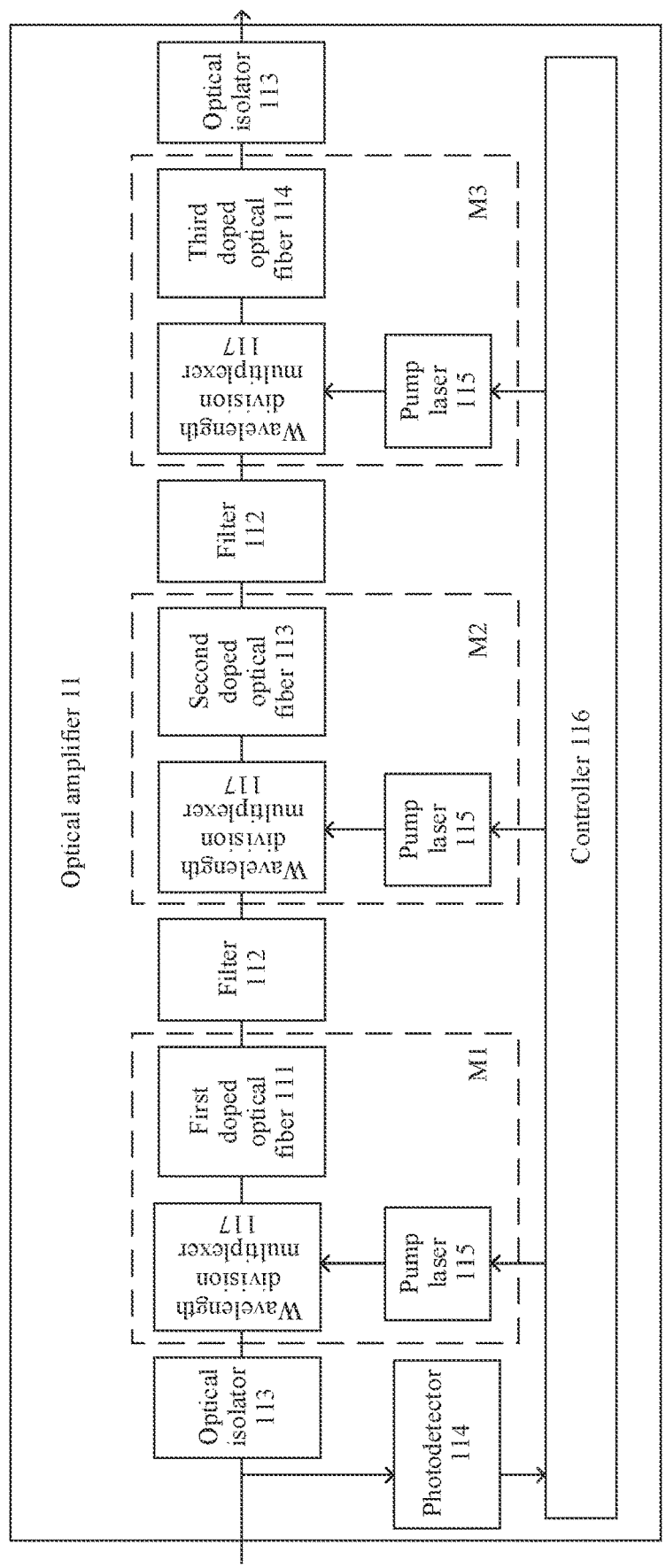
FIG. 13 is a schematic diagram of a structure of still another optical amplifier according to an embodiment of the present disclosure.

Alternatively, as shown in FIG. 13, when the amplification factor of the first-stage amplification structure does not meet an amplification requirement, the optical amplifier 11 may further include: a second-stage amplification structure (shown by a dashed frame M2 in FIG. 13) coupled to the filter 112, a second filter 112 coupled to the second-stage amplification structure, and a third-stage amplification structure (shown by a dashed frame M3 in FIG. 13) coupled to the second filter 112. The second-stage amplification structure includes a second doped optical fiber 113, and the second doped optical fiber 113 is configured to amplify the optical signal obtained after the filtering by the filter 112 and output an obtained optical signal. The second filter 112 is configured to filter the optical signal obtained after the amplification by the second-stage amplification structure and output an obtained optical signal. The third-stage amplification structure includes a third doped optical fiber 114, and the third doped optical fiber 114 is configured to perform saturated amplification on the optical signal obtained after the filtering by the second filter 112 and output an obtained optical signal.

In a feasible implementation, the foregoing doped optical fiber may be an erbium-doped optical fiber doped with a trace amount of erbium ions. Correspondingly, the optical amplifier 11 may be an erbium-doped fiber amplifier (EDFA). Alternatively, the doped optical fiber may alternatively be a doped optical fiber doped with ions of another rare earth element. When the doped optical fiber is doped with different ions, a gain spectrum of the amplifier including the doped optical fiber covers different signal wave bands.

In conclusion, in the optical amplifier provided in this embodiment of the present disclosure, the optical signal is amplified by the first doped optical fiber, an optical signal obtained after the amplification is filtered by the first filter component based on the first power difference of the signals transmitted on the plurality of frequency bands in the optical signal obtained after the amplification, and an optical signal obtained after the filtering by the first filter component is filtered by the second filter component by using a frequency response (controlled by a first driving electrical signal) based on the second power difference of the signals transmitted on the plurality of frequency bands. This can amplify the optical signal, and at least reduce or even eliminate interference caused to the optical signal by the doped optical fiber and a SRS effect, thereby ensuring signal quality of the transmitted optical signal. Further, because the second filter component filters the optical signal by using the frequency response controlled by the first driving electrical signal, costs of the second filter component are reduced, and costs of the filter can be controlled while a filtering effect on the optical signal is ensured.

A person skilled in the art can clearly understand that, for ease and brevity of description, for specific working processes of the filter in the optical amplifier provided in this embodiment of the present disclosure, refer to the description of the corresponding processes in the foregoing filter embodiment.

An embodiment of the present disclosure further provides a communication system. The communication system may include a communication optical fiber and the optical amplifier provided in the embodiment of the present disclosure. The communication optical fiber is configured to transmit an optical signal. The optical amplifier is configured to amplify and filter the optical signal.

The communication system may have a plurality of deployment manners. The following two deployment manners are used as examples to describe the communication system in this embodiment of the present disclosure.

In a first deployment manner of the communication system, the communication system may include a plurality of segments of communication optical fibers. An output end of each segment of communication optical fiber is coupled to one or more optical amplifiers. In this deployment manner, it can be learned that, after a power difference occurs in an optical signal, the filter provided in the embodiment of the present disclosure may be used to perform filtering based on the power difference, to resist a SRS effect in a communication optical fiber.

The following describes the first deployment manner of the communication system by using a communication system as an example, in which an output end of each segment of communication optical fiber is coupled to one optical amplifier, and the optical fiber simultaneously transmits a C-band optical signal and an L-band optical signal.

Figure 14:
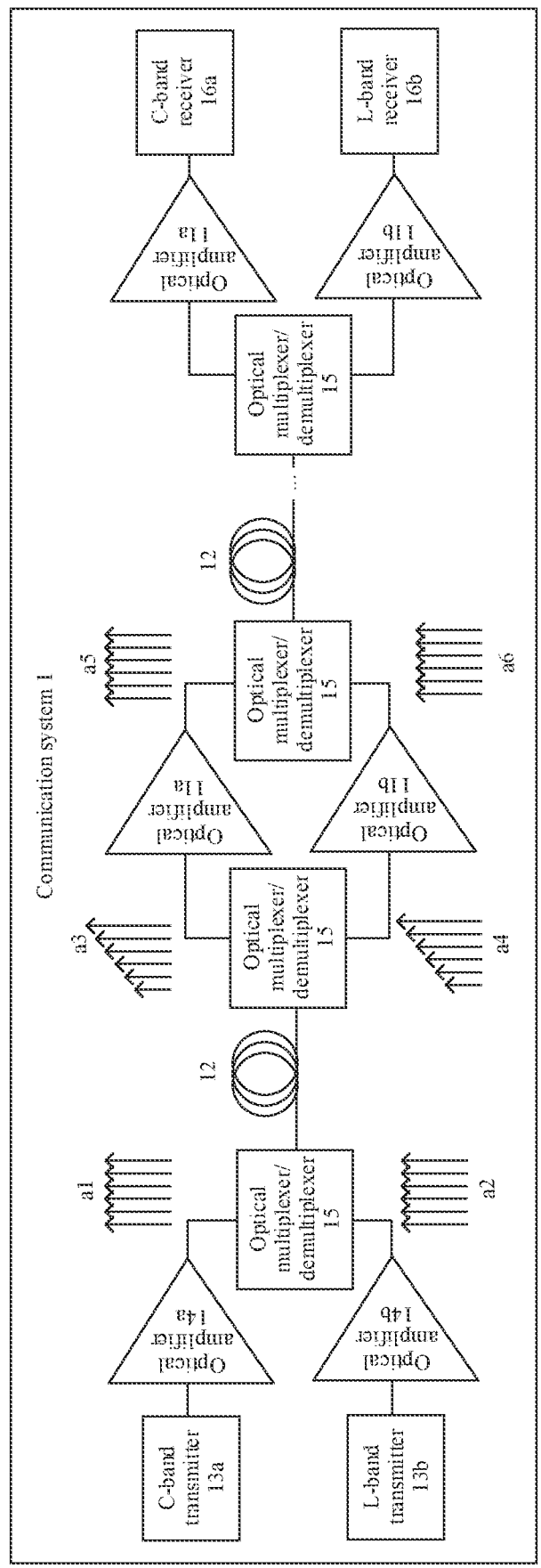
FIG. 14 is a schematic diagram of a structure of a communication system according to an embodiment of the present disclosure.

As shown in FIG. 14, after a C-band transmitter 13a emits a C-band optical signal having a flat power spectrum, an optical amplifier 14a for amplifying a C-band optical signal in a related technology is first used to amplify the C-band optical signal. In addition, from a slope of 0 denoted by a connecting line of a plurality of arrows at a1 in FIG. 14, a power spectrum of a C-band optical signal obtained after the amplification is also flat. After an L-band transmitter 13b emits an L-band optical signal having a flat power spectrum, an optical amplifier 14b for amplifying an L-band optical signal in a related technology is first used to amplify the L-band optical signal. In addition, from a slope of 0 denoted by a connecting line of a plurality of arrows at a2 in FIG. 14, a power spectrum of an L-band optical signal obtained after the amplification is also flat. A length of each arrow in FIG. 14 is used to indicate a magnitude of a power of a signal transmitted on one frequency band in the optical signal.

Then, an optical multiplexer/demultiplexer 15 couples the C-band optical signal and the L-band optical signal that are obtained after the amplification to the communication optical fiber 12. After the transmission through the communication optical fiber 12, under impact of a SRS effect in the communication optical fiber 12, a power difference occurs in signals transmitted on a plurality of frequency bands in the C-band optical signal. The difference can be seen from a positive slope of a connecting line of a plurality of arrows at a3 in FIG. 14. Similarly, from a positive slope of a connecting line of a plurality of arrows at a4 in FIG. 14, a power difference also occurs in signals transmitted on a plurality of frequency bands in the L-band optical signal.

Then, the optical multiplexer/demultiplexer 15 separates the C-band optical signal and the L-band optical signal, and couples the C-band optical signal to an optical amplifier 11 (an optical amplifier 11a shown in FIG. 14) for amplifying a C-band optical signal provided in this embodiment of the present disclosure, and couples the L-band optical signal to an optical amplifier 11 (an optical amplifier 11b shown in FIG. 14) for amplifying an L-band optical signal provided in this embodiment of the present disclosure.

Then, a first doped optical fiber 111 in the optical amplifier 11a for amplifying a C-band optical signal provided in this embodiment of the present disclosure is used to amplify the C-band optical signal. A filter 112 in the optical amplifier 11a is used to filter a C-band optical signal obtained after the amplification, so that a first filter component 112a is used to reduce or even eliminate a first power difference caused by the first doped optical fiber 111 to the signals transmitted on the plurality of frequency bands in the C-band optical signal, and a second filter component 112b is used to reduce or even eliminate a second power difference caused by the communication optical fiber 12 to the signals transmitted on the plurality of frequency bands in the C-band optical signal. From a slope of 0 denoted by a connecting line of a plurality of arrows at a5 in FIG. 14, the filter 112 provided in this embodiment of the present disclosure compensates for the second power difference of the C-band optical signal.

Similarly, after the optical amplifier 11b for amplifying an L-band optical signal provided in this embodiment of the present disclosure is used to amplify and filter the L-band optical signal, a second power difference caused by the communication optical fiber 12 to the signals transmitted on the plurality of frequency bands in the L-band optical signal is reduced or even eliminated. From a slope of 0 denoted by a connecting line of a plurality of arrows at a6 in FIG. 14, the filter 112 provided in this embodiment of the present disclosure compensates for the second power difference of the L-band optical signal.

Then, an optical multiplexer/demultiplexer 15 couples a C-band optical signal and an L-band optical signal that are obtained after the filtering to a communication optical fiber 12. This process is repeated, and an output end of each segment of communication optical fiber 12 is coupled to one optical amplifier 11, until an optical signal receiving end is reached. In addition, at the optical signal receiving end, a C-band optical signal obtained after filtering by a filter 112 provided in this embodiment of the present disclosure is coupled to a C-band receiver 16a, and an L-band optical signal obtained after filtering by a filter 112 provided in this embodiment of the present disclosure is coupled to an L-band receiver 16b.

In a second deployment manner of the communication system 1, the communication system 1 may include a plurality of segments of communication optical fibers 12. An input end of each segment of communication optical fiber 12 is coupled to one or more optical amplifiers 11. In this deployment manner, the filter 112 provided in this embodiment of the present disclosure may be first used to pre-filter an optical signal, and a power difference of an optical signal obtained after the pre-filtering is used to resist a SRS effect in the communication optical fiber 12, thereby achieving an objective of filtering the optical signal based on the power difference.

The following describes the second deployment manner of the communication system 1 by using a communication system 1 as an example, in which an input end of each segment of communication optical fiber 12 is coupled to one optical amplifier 11, and the optical fiber simultaneously transmits a C-band optical signal and an L-band optical signal.

Figure 15:
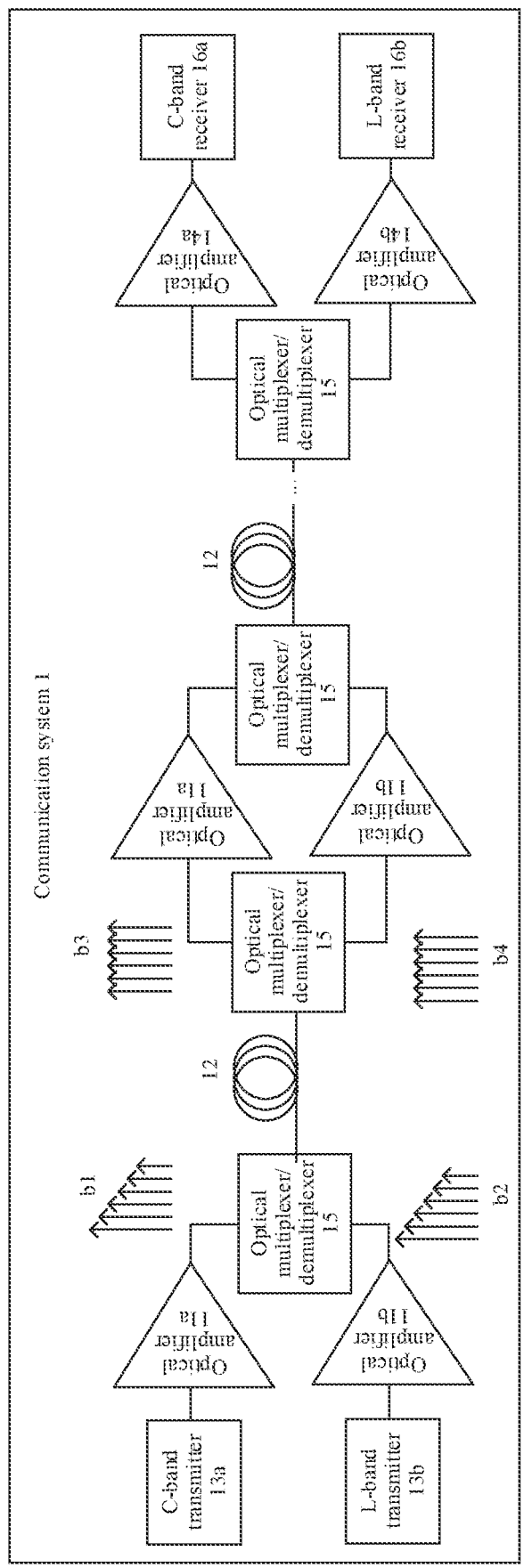
FIG. 15 is a schematic diagram of a structure of another communication system according to an embodiment of the present disclosure.

As shown in FIG. 15, after a C-band transmitter 13a emits a C-band optical signal having a flat power spectrum, the C-band optical signal is first coupled to an optical amplifier 11 (an optical amplifier 11a in FIG. 15) for amplifying a C-band optical signal provided in this embodiment of the present disclosure. A first doped optical fiber 111 in the optical amplifier 11a amplifies the C-band optical signal. Then, a filter 112 in the optical amplifier 11a pre-filters a C-band optical signal obtained after the amplification, so that a power difference occurs in signals transmitted on a plurality of frequency bands in a C-band optical signal obtained after the filtering. From a negative slope denoted by a connecting line of a plurality of arrows at b1 in FIG. 15, the filter 112 provided in this embodiment of the present disclosure implements pre-filtering on the C-band optical signal. A length of each arrow in FIG. 15 is used to indicate a magnitude of a power of a signal transmitted on one frequency band in the optical signal.

Similarly, after an L-band transmitter 13b emits an L-band optical signal having a flat power spectrum, the L-band optical signal is first coupled to an optical amplifier 11b for amplifying an L-band optical signal provided in this embodiment of the present disclosure. A power difference occurs in signals transmitted on a plurality of frequency bands in an L-band optical signal obtained after the amplification and filtering by the optical amplifier 11b. From a negative slope denoted by a connecting line of a plurality of arrows at b2 in FIG. 15, the filter 112 provided in this embodiment of the present disclosure implements pre-filtering on the L-band optical signal.

Then, an optical multiplexer/demultiplexer 15 couples a C-band optical signal and an L-band optical signal that are obtained after the pre-filtering to a communication optical fiber 12. After transmission through the communication optical fiber 12, impact caused by the SRS effect in the communication optical fiber 12 to a power of the C-band optical signal is offset by the power difference caused by the pre-filtering to the C-band optical signal. In this way, a power spectrum of the C-band optical signal transmitted through the communication optical fiber 12 is restored to be flat. This effect can be seen from a slope of 0 denoted by a connecting line of a plurality of arrows at b3 in FIG. 15. Similarly, under the impact of the SRS effect in the communication optical fiber 12, impact caused by the SRS effect to a power of the L-band optical signal is offset by the power difference caused by the pre-filtering to the L-band optical signal. In this way, a power spectrum of the L-band optical signal transmitted through the communication optical fiber 12 is restored to be flat. This effect can be seen from a slope of 0 denoted by a connecting line of a plurality of arrows at b4 in FIG. 15.

Then, the optical multiplexer/demultiplexer 15 separates the C-band optical signal and the L-band optical signal, and couples the C-band optical signal to an optical amplifier 11 for amplifying a C-band optical signal provided in this embodiment of the present disclosure, and couples the L-band optical signal to an optical amplifier 11 for amplifying an L-band optical signal provided in this embodiment of the present disclosure. This process is repeated. An input end of each segment of communication optical fiber 12 is coupled to one optical amplifier 11, until an optical signal receiving end is reached. Then, an optical multiplexer/demultiplexer 15 separates a C-band optical signal and an L-band optical signal at a communication optical fiber 12, and couples the C-band optical signal to an optical amplifier 14a for amplifying a C-band optical signal in a related technology, and couples the L-band optical signal to an optical amplifier 14b for amplifying an L-band optical signal in a related technology. A C-band optical signal obtained after amplification is coupled to a C-band receiver 16a, and an L-band optical signal obtained after amplification is coupled to a L-band receiver 16b.

In addition, when the filter 112 in the communication system 1 provided in this embodiment of the present disclosure further includes the control component 112c shown in FIG. 8, FIG. 9, or FIG. 10, because the control component 112c can obtain a second power difference of an optical signal in real time, if wavelength adding or wavelength dropping occurs in an optical fiber transmission branch in which the filter 112 is located, or when a configuration of the communication system 1 is switched between different wave bands, the SRS effect in the communication optical fiber 12 may vary. In this case, the control component 112c can accurately determine the second power difference of the optical signal, and provide a first driving electrical signal to the second filter component 112b based on the second power difference, thereby ensuring a filtering effect of the filter 112.

For example, when wavelength dropping occurs at a reconfigurable optical add/drop multiplexer (ROADM) site, a total power of an optical signal passing through the ROADM decreases. As a result, a SRS effect on a wavelength-dropped signal in the communication optical fiber is weaker than that on a signal existing before the wavelength dropping in the communication optical fiber. Correspondingly, under impact of the SRS effect, a power difference of the wavelength-dropped signal passing through the communication optical fiber is less than a power difference of the signal existing before the wavelength dropping and passing through the communication optical fiber. In this case, the control component 112c detects the second power difference in real time. Impact of the wavelength dropping on the SRS effect can be tracked in real time, and further the first driving electrical signal to be provided to the second filter component 112b can be further adjusted, thereby ensuring a filtering effect of the filter 112. The wavelength dropping at the ROADM means that light waves in the optical signal are shunted at the ROADM to another optical fiber transmission branch.

Similarly, when wavelength adding occurs at an ROADM site, a total power of an optical signal passing through the ROADM increases. As a result, a SRS effect on a wavelength-added signal in the communication optical fiber is stronger than that on a signal existing before the wavelength adding in the communication optical fiber. Correspondingly, under impact of the SRS effect, a power difference of the wavelength-added signal passing through the communication optical fiber is greater than a power difference of the signal existing before the wavelength adding and passing through the communication optical fiber. In this case, the control component 112c detects the second power difference in real time. Impact caused by the wavelength adding to the SRS effect can be tracked in real time, and the first driving electrical signal to be provided to the second filter component 112b can be further adjusted, thereby ensuring a filtering effect of the filter 112. The wavelength adding at the ROADM means that a plurality of optical signals are converged at the ROADM to a same optical fiber transmission branch.

Figure 16:
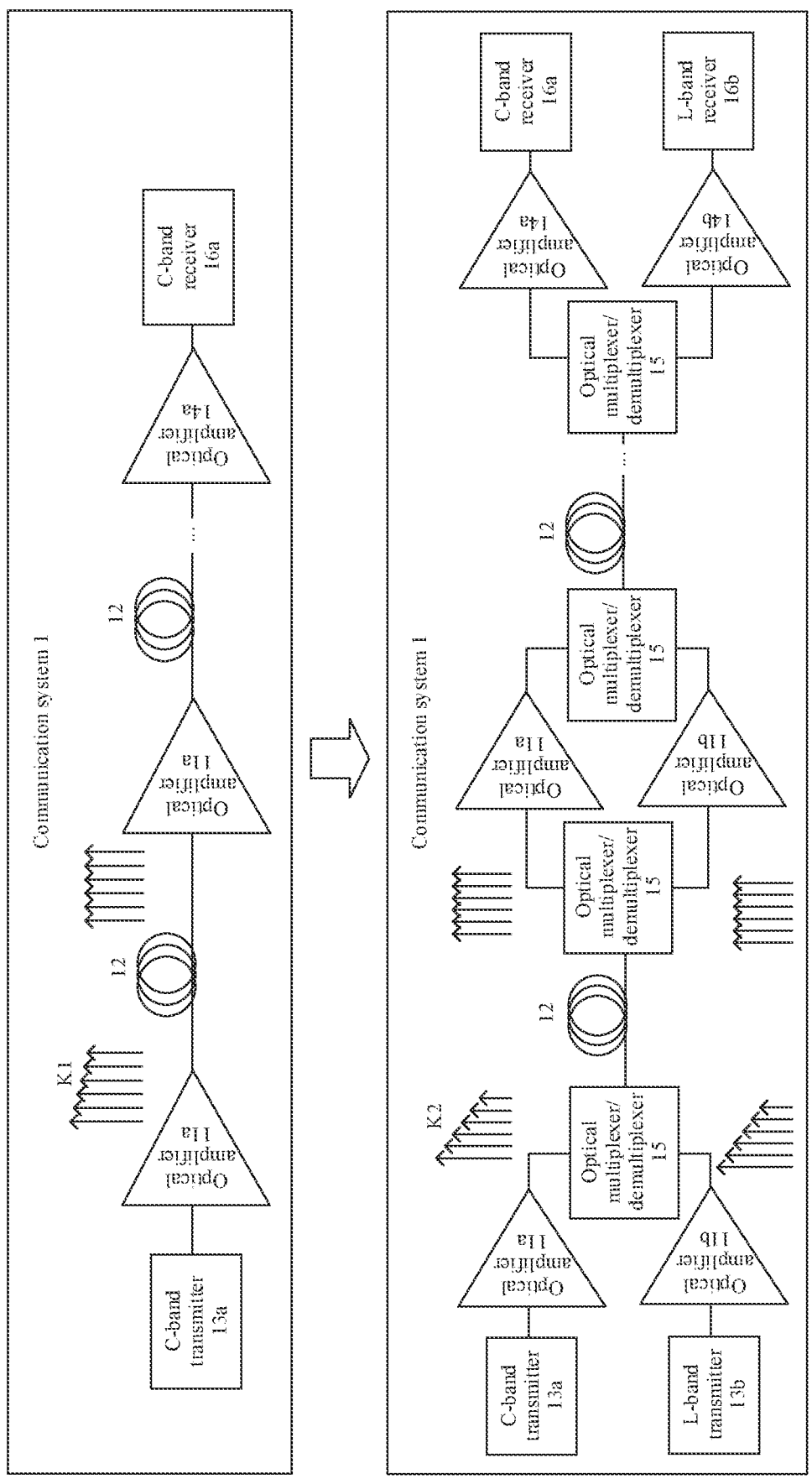
FIG. 16 is a schematic diagram of switching a configuration of a communication system from a C band to a C+L band according to an embodiment of the present disclosure.

For another example, under the impact of the SRS effect in the communication optical fiber 12, a slope of the second power difference of the C-band optical signal is K1, a slope of a second power difference of a C+L-band optical signal is K2, and K1<K2. As shown in FIG. 16, when the configuration of the communication system 1 is switched from a C band to a C+L band, the control component 112c detects a second power difference in real time. Impact caused by wavelength adding to a SRS effect can be tracked in real time, and a slope of a power difference caused by pre-filtering to the optical signal can be adjusted from −K1 to −K2, thereby ensuring a filtering effect of the filter 112.

In conclusion, in the communication system provided in this embodiment of the present disclosure, the optical signal is amplified by the doped optical fiber, an optical signal obtained after the amplification is filtered by the first filter component based on the first power difference of the signals transmitted on the plurality of frequency bands in the optical signal obtained after the amplification, and an optical signal obtained after the filtering by the first filter component is filtered by the second filter component by using a frequency response (controlled by the first driving electrical signal) based on the second power difference of the signals transmitted on the plurality of frequency bands. This can amplify the optical signal, and at least reduce or even eliminate interference caused to the optical signal by the doped optical fiber and the SRS effect, thereby ensuring signal quality of the transmitted optical signal. Further, because the second filter component filters the optical signal by using the frequency response controlled by the first driving electrical signal, costs of the second filter component are reduced, and costs of the filter can be controlled while a filtering effect on the optical signal is ensured.

A person skilled in the art can clearly understand that, for ease and brevity of description, for specific working processes of the optical amplifier and the filter in the communication system provided in this embodiment of the present disclosure, refer to the description of the corresponding processes in the foregoing amplifier embodiment and filter embodiment.

Figure 17:
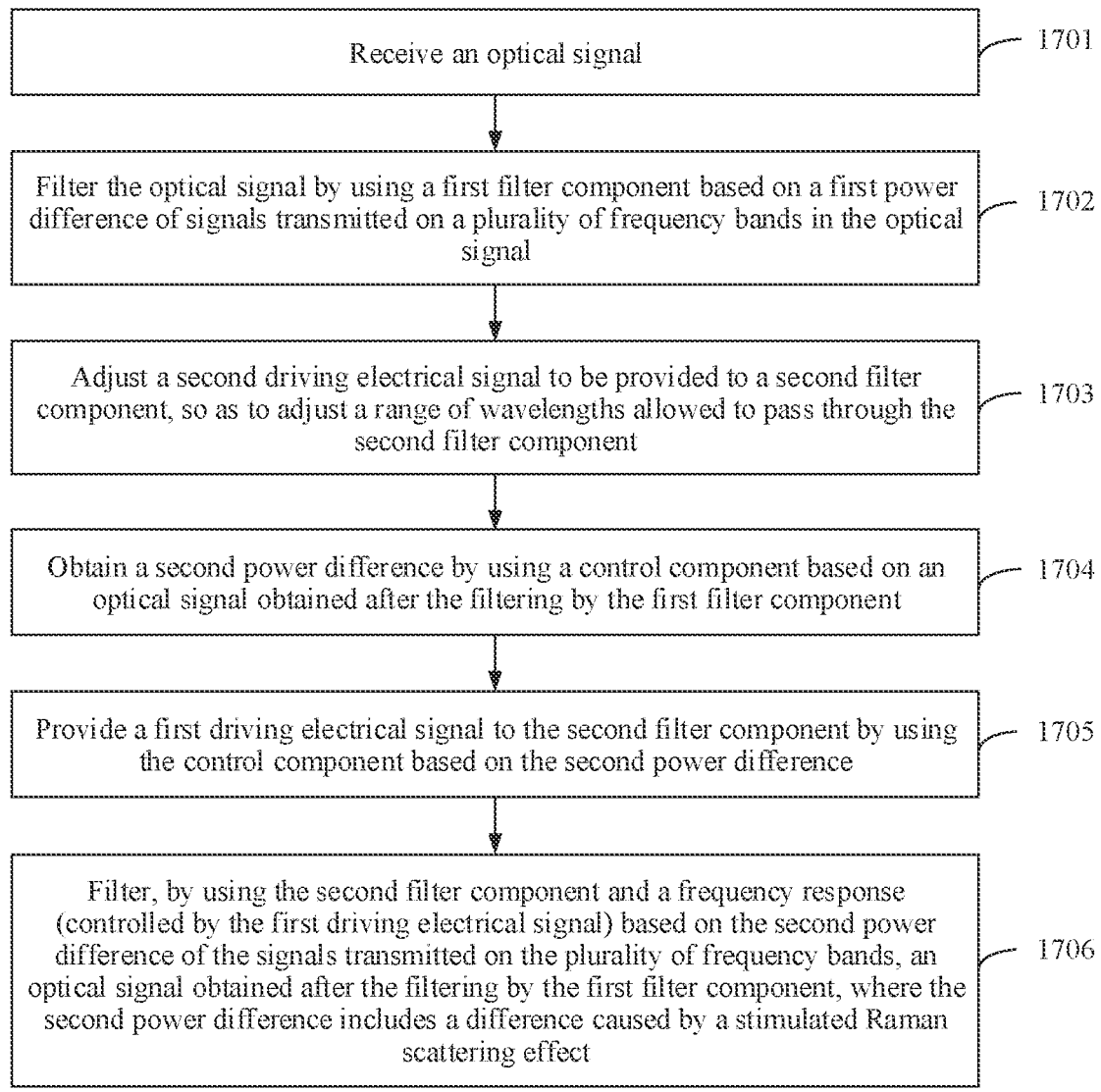
FIG. 17 is a flowchart of a filtering method according to an embodiment of the present disclosure.

An embodiment of the present disclosure further provides a filtering method. The filtering method is applied to the filter provided in the embodiment of the present disclosure. As shown in FIG. 17, the filtering method includes the following steps.

Step 1701: Receive an optical signal.

Step 1702: Filter the optical signal by using a first filter component based on a first power difference of signals transmitted on a plurality of frequency bands in the optical signal.

The first power difference includes a difference caused by a first doped optical fiber.

Step 1703: Adjust a second driving electrical signal to be provided to a second filter component, so as to adjust a range of wavelengths allowed to pass through the second filter component.

It should be noted that, step 1703 is an optional step, and whether to perform this step may be determined based on an application requirement. For example, before the second driving signal to be provided to the second filter component is adjusted, if the range of wavelengths allowed to pass through the second filter component already covers a range of wavelengths of an optical signal transmitted in an optical fiber transmission branch in which the second filter component is located, step 1703 does not need to be performed.

Step 1704: Obtain a second power difference by using a control component based on an optical signal obtained after the filtering by the first filter component.

An implementation of step 1704 varies with a deployment manner of the control component.

In a feasible implementation, when the control component is coupled to the second filter component, the control component may obtain the second power difference based on parameters such as a total input power of an optical fiber transmission branch in which the filter is located and a frequency band width of the optical signal transmitted in the optical fiber transmission branch.

Figure 18:
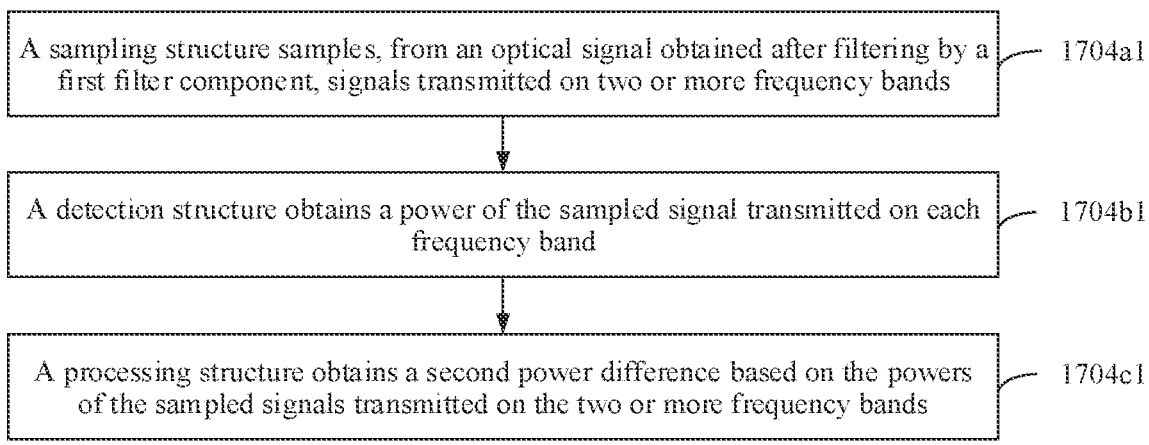
FIG. 18 is a flowchart of a method for obtaining a second power difference by a control component based on an optical signal obtained after filtering by a first filter component according to an embodiment of the present disclosure.

In another feasible implementation, when the control component is separately coupled to the first filter component and the second filter component, the control component may detect in real time the second power difference of the optical signal obtained after the filtering by the first filter component. For example, when the control component includes a sampling structure, a detection structure, and a processing structure that are sequentially coupled, as shown in FIG. 18, an implementation process of step 1704 may include the following steps:

Step 1704a1: The sampling structure samples, from the optical signal obtained after the filtering by the first filter component, signals transmitted on two or more frequency bands.

Step 1704b1: The detection structure obtains a power of the sampled signal transmitted on each frequency band.

Step 1704c1: The processing structure obtains the second power difference based on the powers of the sampled signals transmitted on the two or more frequency bands.

Step 1705: Provide a first driving electrical signal to the second filter component by using the control component based on the second power difference.

Optionally, step 1705 may be performed by the processing structure when the control component includes the sampling structure, the detection structure, and the processing structure that are sequentially coupled.

It should be noted that, step 1704 and step 1705 are optional steps, and whether to perform these steps may be determined based on an application requirement. For example, when the filter does not include a control component, for example, when the second filter module is loaded with a first driving electrical signal of a fixed amplitude, step 1704 and step 1705 do not need to be performed.

Step 1706: Filter, by using the second filter component and a frequency response (controlled by the first driving electrical signal) based on the second power difference of the signals transmitted on the plurality of frequency bands, an optical signal obtained after the filtering by the first filter component, where the second power difference includes a difference caused by a SRS effect.

In conclusion, in the filtering method provided in this embodiment of the present disclosure, the optical signal is filtered by the first filter component based on the first power difference of the signals transmitted on the plurality of frequency bands in the optical signal, and the optical signal obtained after the filtering by the first filter component is filtered by the second filter component by using the frequency response (controlled by the first driving electrical signal) based on the second power difference of the signals transmitted on the plurality of frequency bands. This can at least reduce or even eliminate interference caused to the optical signal by a doped optical fiber and the SRS effect, thereby ensuring signal quality of the transmitted optical signal. Further, because the second filter component filters the optical signal by using the frequency response controlled by the first driving electrical signal, costs of the second filter component are reduced, and costs of the filter can be controlled while a filtering effect on the optical signal is ensured.

A person skilled in the art understands that, for ease and brevity of description, for specific working processes of the filter in the filtering method provided in this embodiment of the present disclosure, refer to the description of the corresponding processes in the foregoing filter embodiment.

Figure 19:
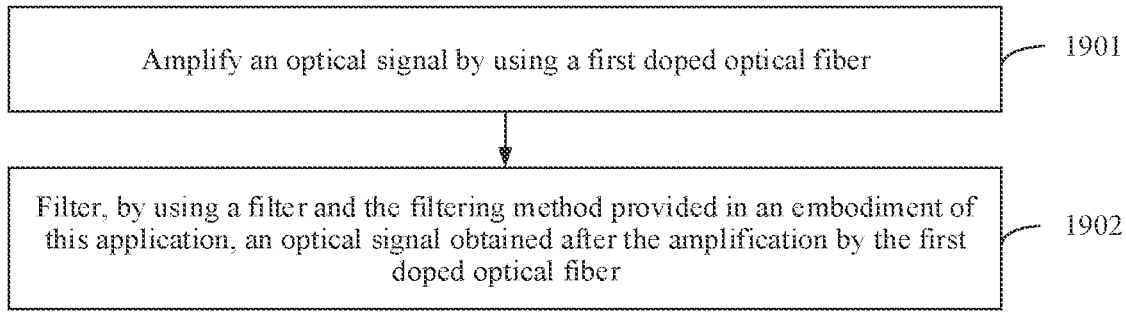
FIG. 19 is a flowchart of an optical amplification method according to an embodiment of the present disclosure.

An embodiment of the present disclosure further provides an optical amplification method. The optical amplification method is applied to the optical amplifier provided in the embodiment of the present disclosure. As shown in FIG. 19, the optical amplification method includes the following steps.

Step 1901: Amplify an optical signal by using a first doped optical fiber.

Step 1902: Filter, by using a filter and the filtering method provided in the embodiment of the present disclosure, an optical signal obtained after the amplification by the first doped optical fiber.

In conclusion, in the optical amplification method provided in this embodiment of the present disclosure, the optical signal is amplified by the first doped optical fiber, the optical signal obtained after the amplification is filtered by a first filter component based on a first power difference of signals transmitted on a plurality of frequency bands in the optical signal obtained after the amplification, and an optical signal obtained after the filtering by the first filter component is filtered by a second filter component by using a frequency response (controlled by a first driving electrical signal) based on a second power difference of the signals transmitted on the plurality of frequency bands. This can amplify the optical signal, and at least reduce or even eliminate interference caused to the optical signal by the doped optical fiber and a SRS effect, thereby ensuring signal quality of the transmitted optical signal. Further, because the second filter component filters the optical signal by using the frequency response controlled by the first driving electrical signal, costs of the second filter component are reduced, and costs of the filter can be controlled while a filtering effect on the optical signal is ensured.

A person skilled in the art understands that, for ease and brevity of description, for specific working processes of the optical amplifier and the filter in the optical amplification method provided in this embodiment of the present disclosure, refer to the description of the corresponding processes in the foregoing amplifier embodiment and filter embodiment.

An embodiment of the present disclosure further provides a storage medium. The storage medium is a non-volatile computer-readable storage medium. When instructions in the storage medium are executed by a processor, the filtering method provided in the embodiment of the present disclosure is implemented.

An embodiment of the present disclosure further provides a computer program product including instructions. When the computer program product is run on a computer, the computer is enabled to perform the filtering method provided in the embodiment of the present disclosure.

A person of ordinary skill in the art understands that all or a part of the steps of the foregoing embodiments may be implemented by hardware or a program instructing related hardware. The program may be stored in a computer-readable storage medium. The storage medium mentioned above may be a read-only memory, a magnetic disk, a compact disc, or the like.

In embodiments of the present disclosure, the terms "first", "second", and "third" are used only for descriptive purposes and cannot be construed as indicating or implying relative importance. The term "at least one" refers to one or more, and the term "a plurality of" refers to two or more, unless otherwise expressly limited.

The term "and/or" in the present disclosure describes only an association relationship between associated objects and represents that three relationships may exist. For example, A and/or B may represent the following three cases: Only A exists, both A and B exist, and only B exists. In addition, the character "/" in this specification generally indicates an "or" relationship between the associated objects.

The foregoing descriptions are only optional embodiments of the present disclosure, and are not intended to limit the present disclosure. Any modification, equivalent replacement, or improvement made within the concept and principle of the present disclosure falls within the protection scope of this application.

What is claimed is:

1. A filter comprising:
   a first filter component configured to:
      receive a first optical signal; and
      filter the first optical signal, based on a first power difference of signals transmitted on a plurality of frequency bands in the first optical signal, to obtain a second optical signal, wherein the first power difference comprises a first difference caused by a first doped optical fiber; and
   a second filter component coupled to the first filter component and configured to:
      receive the second optical signal from the first filter component;
      control, using a first driving electrical signal loaded in the second filter component, a frequency response of the second filter component; and
      filter, using the frequency response based on a second power difference of the signals transmitted on the plurality of frequency bands, the second optical signal, wherein the second power difference comprises a second difference caused by a stimulated Raman scattering (SRS) effect.

2. The filter according to of claim 1, wherein the second filter component is further configured to adjust, under control by a second driving electrical signal, a range of wavelengths allowed to pass through the second filter component.

3. The filter of claim 1, further comprising a control component separately coupled to the first filter component and the second filter component, wherein the control component is configured to:
   obtain the second power difference based on the second optical signal, and
   provide the first driving electrical signal to the second filter component based on the second power difference.

4. The filter of claim 3, wherein the control component comprises:
   a sampling structure configured to sample, from the second optical signal, signals transmitted on two or more frequency bands;
   a detection structure coupled to the sampling structure, wherein the detection structure is configured to obtain a power of a signal transmitted on each frequency band sampled by the sampling structure; and
   a processing structure coupled to the detection structure, wherein the processing structure configured to
      obtain the second power difference based on powers of sampled signals transmitted on the two or more frequency bands;
      determine the first driving electrical signal based on the second power difference; and
      provide the first driving electrical signal to the second filter component.

5. The filter of claim 4, wherein the control component comprises a processing structure, a plurality of sampling structures, and a plurality of detection structures corresponding to the plurality of sampling structures, wherein the sampling structures are coupled to the detection structures, wherein the plurality of detection structures are coupled to the processing structure, and wherein each sampling structure in the sampling structures is configured to sample, from the second optical signal, a signal transmitted on one frequency band and wherein each detection structure in the detection structures is configured to obtain a power of a signal transmitted on a frequency band and sampled by a corresponding sampling structure.

6. The filter of claim 1, further comprising a control component coupled to the second filter component, wherein the control component is configured to:
   obtain the second power difference based on a total input power of an optical fiber transmission branch in which the filter is located and a frequency bandwidth of the first optical signal transmitted in the optical fiber transmission branch;
   determine the first driving electrical signal based on the second power difference; and
   provide the first driving electrical signal to the second filter component.

7. The filter of claim 1, wherein the first filter component is further configured to determine a frequency response of the first filter component based on a power difference caused by the first doped optical fiber to signals transmitted on a target quantity of frequency bands, and wherein the target quantity is less than a total quantity of frequency bands allowed to pass through the first doped optical fiber.

8. The filter of claim 1, wherein the first filter component comprises a gain flattening filter and/or the second filter component comprises a variable gain tilt filter.

9. An optical amplifier comprising:
a first doped optical fiber
configured to amplify an optical signal using doped ions in the first doped optical fiber;
a filter coupled to the first doped optical fiber, the filter comprising:
   a first filter component
   configured to receive a first optical signal, and filter the first optical signal based on a first power difference of signals transmitted on a plurality of frequency bands in the first optical signal to obtain a second optical signal, wherein the first power difference comprises a first difference caused by the first doped optical fiber; and
   a second filter component coupled to the first filter component and configured to receive the second optical signal from the first filter component, and control, using a first driving electrical signal loaded in the second filter component, a frequency response of the second filter component, wherein the second filter component is configured to filter, using the frequency response based on a second power difference of the signals transmitted on the plurality of frequency bands, the second optical signal to obtain a third optical signal, wherein the second power difference comprises a second difference caused by a stimulated Raman scattering (SRS) effect.

10. The optical amplifier of claim 9, wherein the optical amplifier further comprises a second doped optical fiber coupled to the filter, wherein the second doped optical fiber is configured to perform saturated amplification on the third optical signal and output an obtained optical signal.

11. A communication system comprising:
an optical amplifier comprising:
   a first doped optical fiber
   configured to amplify a first optical signal using doped ions in the first doped optical fiber;
   a filter coupled to the first doped optical fiber, the filter comprising:
      a first filter component configured to receive the first optical signal, and filter the first optical signal, based on a first power difference of signals transmitted on a plurality of frequency bands in the first optical signal, to obtain a second optical signal, wherein the first power difference comprises a first difference caused by the first doped optical fiber; and
      a second filter component coupled to the first filter component, wherein the second filter component is loaded with a first driving electrical signal used to control a frequency response of the second filter component, and wherein the second filter component is configured to filter, using the frequency response based on a second power difference of the signals transmitted on the plurality of frequency bands, the second optical signal, wherein the second power difference comprises a second difference caused by a stimulated Raman scattering (SRS) effect.

12. The communication system of claim 11, further comprising a plurality of segments of communication optical fibers configured to transmit an optical signal, wherein an output end of each segment of communication optical fiber is coupled to one or more optical amplifiers.

13. The communication system of claim 11, further comprising a plurality of segments of communication optical fibers configured to transmit an optical signal, wherein an input end of each segment of communication optical fiber is coupled to one or more optical amplifiers.

14. A filtering method implemented by a filter comprising a first filter component coupled to a second filter component, the filtering method comprising:
receiving a first optical signal;
filtering, by the first filter component, the first optical signal based on a first power difference of signals transmitted on a plurality of frequency bands in the first optical signal to obtain a second optical signal, wherein the first power difference comprises a first difference caused by a first doped optical fiber; and
filtering, by the second filter component, the second optical signal using a frequency response controlled by a first driving electrical signal based on a second power difference of the signals transmitted on the plurality of frequency bands, wherein the second power difference comprises a second difference caused by a stimulated Raman scattering (SRS) effect.

15. The filtering method of claim 14, further comprising:
adjusting a second driving electrical signal to adjust a range of wavelengths allowed to pass through the second filter component; and
sending the second driving electrical signal to the second filter component.

16. The filtering method of claim 14, wherein the filter further comprises a control component separately coupled to the first filter component and the second filter component, and prior to filtering, by the second filter component, the filtering method further comprises:
obtaining, by the control component, the second power difference based on the second optical signal; and
providing, by the control component, the first driving electrical signal to the second filter component based on the second power difference.

17. The filtering method according to of claim 16, wherein obtaining the second power difference comprises:
sampling, from the second optical signal, signals transmitted on two or more frequency bands;
obtaining a power of a sampled signal transmitted on each frequency band; and
obtaining the second power difference based on powers of the signals sampled on the two or more frequency bands.

18. The filtering method according to of claim 17, wherein the providing the first driving electrical signal to the second filter component based on the second power difference comprises:
determining the first driving electrical signal based on the second power difference; and
providing the first driving electrical signal to the second filter component.

19. The filtering method according to of claim 14, wherein prior to filtering by the second filter component, the filtering method further comprises:
obtaining the second power difference based on a total input power of an optical fiber transmission branch in which the filter is located and a frequency bandwidth of the first optical signal transmitted in the optical fiber transmission branch;
determining the first driving electrical signal based on the second power difference; and
providing the first driving electrical signal to the second filter component.

20. An optical amplification method implemented by an optical amplifier comprising a first doped optical fiber and a filter, the optical amplification method comprising:

amplifying, using the first doped optical fiber, a first optical signal to obtain an amplified optical signal; and filtering, using the filter, the amplified optical signal, wherein filtering comprises:

receiving the amplified optical signal;

filtering, using a first filter component of the filter, the amplified optical signal based on a first power difference of signals transmitted on a plurality of frequency bands in the amplified optical signal to obtain a first optical signal, wherein the first power difference comprises a first difference caused by a first doped optical fiber; and filtering, using a second filter component of the filter, the first optical signal using a frequency response controlled by a first driving electrical signal based on a second power difference of the signals transmitted on the plurality of frequency bands, wherein the second power difference comprises a second difference caused by a stimulated Raman scattering (SRS) effect.

* * * * *

UNITED STATES PATENT AND TRADEMARK OFFICE
CERTIFICATE OF CORRECTION

PATENT NO. : 12,034,486 B2
APPLICATION NO. : 17/990331
DATED : July 9, 2024
INVENTOR(S) : Qiang Guo et al.

It is certified that error appears in the above-identified patent and that said Letters Patent is hereby corrected as shown below:

In the Claims

Claim 2, Column 24, Line 1: "The filter according to of claim 1, wherein the second" should read "The filter of claim 1, wherein the second"

Claim 4, Column 24, Line 24: "wherein the processing structure configured to" should read "wherein the processing structure configured to:"

Claim 18, Column 26, Line 45: "The filtering method according to of claim 17, wherein" should read "The filtering method of claim 17, wherein"

Claim 19, Column 26, Line 53: "The filtering method according to of claim 14, wherein" should read "The filtering method of claim 14, wherein"

Signed and Sealed this
Eleventh Day of February, 2025

Coke Morgan Stewart
*Acting Director of the United States Patent and Trademark Office*